US012411432B2

(12) United States Patent
Matsushita et al.

(10) Patent No.: US 12,411,432 B2
(45) Date of Patent: Sep. 9, 2025

(54) IMAGE FORMING APPARATUS

(71) Applicant: CANON KABUSHIKI KAISHA, Tokyo (JP)

(72) Inventors: Shunsuke Matsushita, Kanagawa (JP); Toshihiko Takayama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/800,273

(22) Filed: Aug. 12, 2024

(65) Prior Publication Data

US 2025/0068117 A1 Feb. 27, 2025

(30) Foreign Application Priority Data

Aug. 25, 2023 (JP) ................................ 2023-137526

(51) Int. Cl.
*G03G 15/02* (2006.01)
*G03G 15/08* (2006.01)
(Continued)

(52) U.S. Cl.
CPC ..... *G03G 15/0225* (2013.01); *G03G 15/0258* (2013.01); *G03G 15/0275* (2013.01); *G03G 15/0856* (2013.01); *G03G 15/0896* (2013.01); *G03G 21/0035* (2013.01); *G03G 21/0064* (2013.01); *G03G 21/10* (2013.01); *G03G 21/0088* (2013.01); *G03G 2215/0891* (2013.01);
(Continued)

(58) Field of Classification Search
CPC ........... G03G 15/0225; G03G 15/0258; G03G 15/0275; G03G 15/0856; G03G 15/0896; G03G 21/0035; G03G 21/0064; G03G 21/0088; G03G 21/10; G03G 2215/0891; G03G 2221/1621; G03G 2221/1627
See application file for complete search history.

(56) References Cited

U.S. PATENT DOCUMENTS 10,866,533 B2 * 12/2020 Kawamoto .......... G03G 15/161
2008/0240757 A1 10/2008 Suzuki
(Continued)

FOREIGN PATENT DOCUMENTS

| | | | |
|---|---|---|---|
| JP | 2005115055 | A | 4/2005 |
| JP | 2008249769 | A | 10/2008 |
| JP | 2010026198 | A | 2/2010 |

*Primary Examiner* — Joseph S Wong
(74) *Attorney, Agent, or Firm* — ROSSI, KIMMS & McDOWELL LLP

(57) ABSTRACT

An image forming apparatus includes an image bearing member, a charging member, a development member, a developer accommodating portion, a first acquiring portion which acquires developer amount information related to an amount of the developer accommodated in the developer accommodating portion, a second acquiring portion which acquires development drive information related to a movement distance of a surface of the development member, and a control portion which is capable of executing a first mode and a second mode, whose frequency of driving the development member lower than that of the first mode, as an image forming mode. The control portion proposes or determines a change from the first mode to the second mode of the image forming mode on the basis of the developer amount information and the development drive information.

16 Claims, 9 Drawing Sheets

(51) Int. Cl.
*G03G 21/00* (2006.01)
*G03G 21/10* (2006.01)

(52) U.S. Cl.
CPC ............... *G03G 2221/1621* (2013.01); *G03G 2221/1627* (2013.01)

(56) References Cited

U.S. PATENT DOCUMENTS

| | | | | |
|---|---|---|---|---|
| 2017/0115622 | A1* | 4/2017 | Okayasu ............ | G03G 21/0064 |
| 2019/0286031 | A1* | 9/2019 | Mukai ................ | G03G 15/0266 |

* cited by examiner

IMAGE FORMING APPARATUS

BACKGROUND OF THE INVENTION

Field of the Invention

The present invention relates to an image forming apparatus which forms an image on a recording material.

Description of the Related Art

In an image forming apparatus which forms an image on a recording material by using an electrophotographic system (electrophotographic process), for a purpose of size reduction of the apparatus, a cleaner-less method is proposed in which a cleaning member which is brought into contact with a surface of an image bearing member and cleans the image bearing member is excluded. The cleaner-less method is a method such that a developer (toner) remaining on the surface of the image bearing member after a transfer process is cleaned by a development member at the same time as development, and the developer on the image bearing member is removed, recovered, and re-used.

In the image forming apparatus of the cleaner-less method, a charging member or a transfer member which is brought into contact with the image bearing member can be stained by a developer remaining on the image bearing member. Japanese Patent Application Publication No. 2010-26198 discloses a configuration in which a cleaning operation is performed such that the developer adhering to the surface of a member in contact with the image bearing member is moved to the surface of the image bearing member by changing a voltage to be applied to the charging member or the transfer member and the member is cleaned.

SUMMARY OF THE INVENTION

However, as in the aforementioned configuration, for example, when the development member or a supply member which supplies a developer to the development member is rotated during a cleaning operation, which is an operation other than the image forming operation, the developer in a developing device is repeatedly brought into sliding contact. Then, the developer could deteriorate due to removal, embedding (buried) or the like of an external additive added to the developer. Particularly, if a consumption amount of the developer is small with respect to drive time of the developing device, the deterioration of the developer is promoted. And the deterioration of the developer incurs lowering of an electric charge amount or the like, and there is a concern that defective images such as so-called fogging in which the toner adheres to a white background of the recording material is incurred.

Moreover, particularly in a configuration in which the image bearing member and the development member are driven also in a non-image forming operation such as a cleaning operation, since the developing device is driven each time the cleaning operation is performed, the toner deterioration would be easily promoted. In the configuration in which the image bearing member or the development member is repeatedly driven in the non-image forming operation as above, there is a concern that occurrence of defective images would be accelerated.

The present invention has been made in view of the aforementioned problems and has an object to provide an image forming apparatus which can suppress occurrence of defective images.

In order to achieve the aforementioned object, an image forming apparatus according to this application includes:

an image bearing member which is rotatable;

a charging member which is rotatable and charges the image bearing member;

a development member which is rotatable and supplies a developer to a surface of the image bearing member;

a developer accommodating portion which accommodates therein a developer supplied to the development member;

a first acquiring portion which acquires developer amount information related to an amount of a developer accommodated in the developer accommodating portion;

a second acquiring portion which acquires development drive information related a movement distance on a surface of the development member; and a control portion which is capable of performing a first mode and a second mode, whose frequency of driving the development member is lower than the first mode, as an image forming mode, the control portion proposing or deciding on a change of the image forming mode from the first mode to the second mode on the basis of the developer amount information and the development drive information.

According to the present invention, an image forming apparatus which can suppress occurrence of detective images can be provided.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments. In addition, not all features described in the following embodiments are essential to solutions provided by the invention.

Embodiment 1

Schematic Configuration of Image Forming Apparatus

Figure 1:
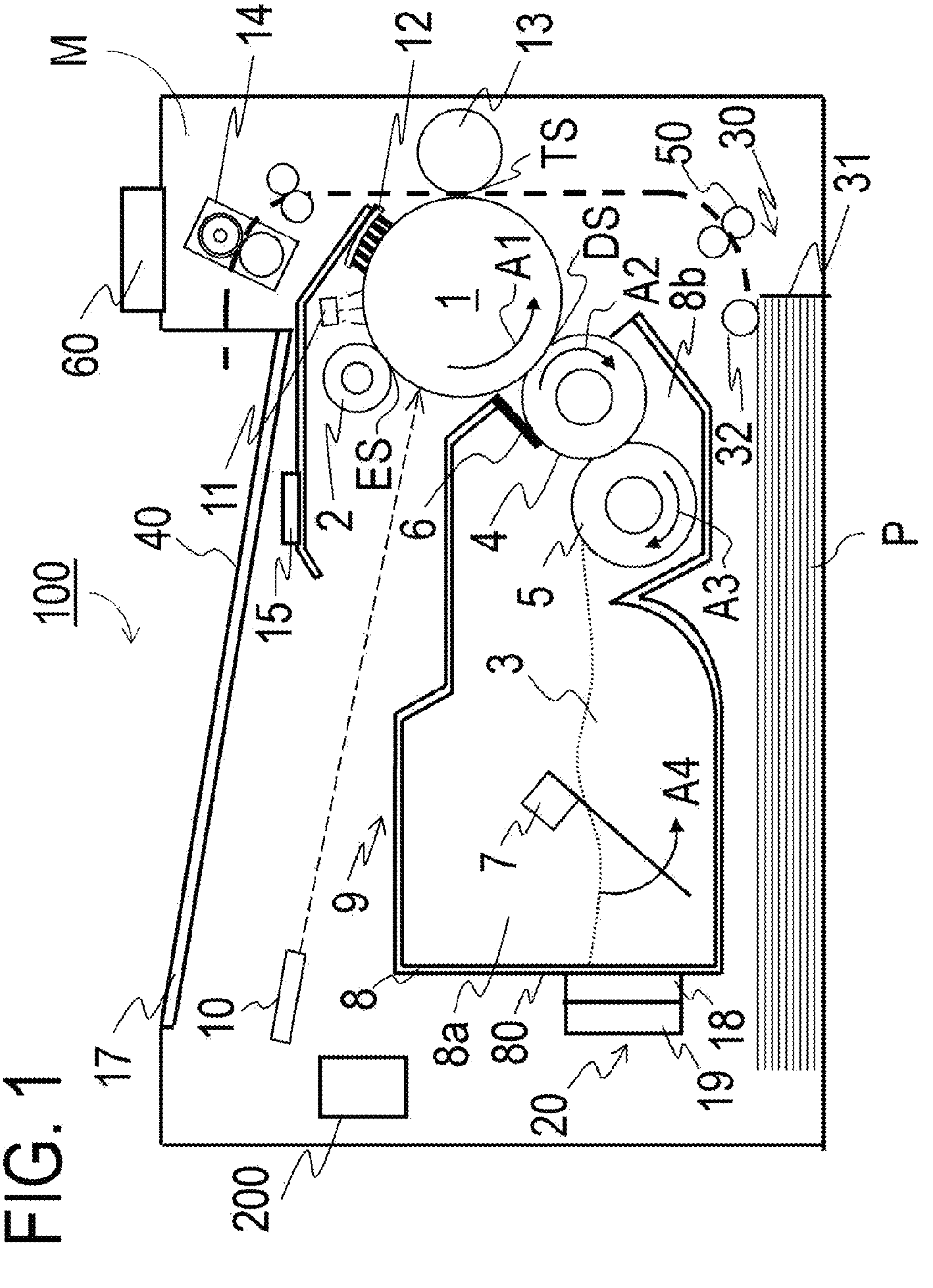
FIG. 1 is a schematic sectional view of an image forming apparatus of Embodiment 1.

First, a schematic configuration of an image forming apparatus 100 of Embodiment 1 will be explained. FIG. 1 is a schematic sectional view of the image forming apparatus 100 of Embodiment 1. The image forming apparatus 100 of Embodiment 1 is a monochrome laser printer capable of forming a black monochrome image on a sheet-state recording material P by using an electrophotographic system and is constituted such that a process cartridge 9 is detachable with respect to an apparatus main body M. Here, the apparatus main body M is a constituent part excluding the process cartridge 9 in the image forming apparatus 100.

Note that the image forming apparatus to which the present invention can be applied is not limited to the image forming apparatus having the basic configuration shown in Embodiment 1. For example, the present invention can be applied to a color laser printer which detachably has a plurality of the process cartridges 9 and forms a full-color image by transferring toner images in plural colors to the recording material P by using an intermediate transfer body such as an intermediate transfer belt or the like. Moreover, the image forming apparatus 100 of Embodiment 1 has such a configuration that the process cartridge 9 is detachable, but the present invention can be also applied to such an image forming apparatus in which a process unit with a configuration similar to that of the process cartridge 9 in Embodiment 1 is provided in the apparatus main body.

The process cartridge 9 has a photosensitive drum 1, which is a drum-type (cylindrical) photosensitive body (electrophotographic photosensitive body) rotatable as an image bearing member. Moreover, the process cartridge 9 has a charging roller 2, which is a roller-type charging member as charging means, and a developing device 8 as developing means in a periphery of the photosensitive drum 1. Moreover, the process cartridge 9 has a brush member 12 as a paper-powder recovering member, and a charge removing device 11 as charge removing means in a periphery of the photosensitive drum 1. Moreover, the process cartridge 9 has a memory 15, which is nonvolatile memory means. Furthermore, the process cartridge 9 has a toner amount sensor (toner residual-amount sensor) 20 as developer-amount detecting means.

The charging roller 2, the brush member 12, and the development roller 4 as a developer bearing member provided in the developing device 8 are disposed in contact with a surface (outer peripheral surface) of the photosensitive drum 1. The process cartridge 9 is configured to be detachably attached easily to the apparatus main body M integrally via attaching means (not shown) such as an attachment guide, a positioning member or the like provided in the apparatus main body M and the process cartridge 9.

Moreover, the image forming apparatus 100 has a transfer roller 13 as transfer means, an exposure device 10 as exposure means, and a fixing device 14 as fixing means (fixing unit). The transfer roller 13 is a roller-type transfer member disposed in contact with the surface of the photosensitive drum 1.

Furthermore, the image forming apparatus 100 has a control portion 200 which manages control of the entire image forming apparatus 100, an operation panel 60 as an operation portion and the like. The operation panel 60 is configured by having a display portion for displaying information to an operator such as a user and a service staff by control of the control portion 200, an input portion for inputting information to the control portion 200 in accordance with the operation of the operator and the like.

Image Forming Operation

Subsequently, the image forming operation in the image forming apparatus 100 of Embodiment 1 will be explained. FIG. 1 illustrates a conveyance path of the recording material P in the image forming operation by a dotted line.

The photosensitive drum 1 is rotated/driven in an arrow A1 direction (counterclockwise direction) in the drawing at a predetermined process speed by a drive force transmitted from a drive motor (not shown) as a drive source constituting drive means provided in the apparatus main body M. Here, the process speed corresponds to a peripheral speed (surface movement speed) of the photosensitive drum 1. The process speed of the photosensitive drum 1 in Embodiment 1 is 140 rpm.

The charging roller 2 is a rotatable charging member for charging the photosensitive drum 1 and forms a charging portion ES by being brought into contact with the surface of the photosensitive drum 1 at a predetermined contact pressure. To the charging roller 2, a predetermined charging voltage (charging bias), which is a DC voltage, is applied from a charging-voltage application circuit (not shown) as a voltage applying portion (charging-voltage applying means) provided in the apparatus main body M. As a result, the charging roller 2 executes charging processing of the surface of the photosensitive drum 1 uniformly to a predetermined potential of a predetermined polarity (negative polarity in Embodiment 1). In Embodiment 1, a charging voltage of −1400 V is applied to the charging roller 2 so that a surface potential (potential VD before exposure) of the photosensitive drum 1 becomes −800 V. Note that, a DC voltage is used as the charging voltage in Embodiment 1, but this is not limiting, and a vibration voltage in which the DC voltage and the AC voltage are overlapped as the charging voltage may be used.

The surface of the photosensitive drum 1, which was uniformly charging-processed, is scanned and exposed by the exposure device 10 by being irradiated with a laser beam on the basis of image information, and an electrostatic latent image (electrostatic image) is formed on the photosensitive drum 1. In Embodiment 1, the exposure device 10 is constituted by a scanner unit. The image information input into the image forming apparatus 100 from an external device (not shown) such as a personal computer connected to the image forming apparatus 100 is converted to a time-series electro-digital image signal by a video controller (not shown) provided in the image forming apparatus 100. The exposure device 10 is controlled by the control portion 200, emits a laser beam demodulated correspondingly to the aforementioned time-series electro-digital image signal, and scans and exposes the surface of the photosensitive drum 1. As a result, an electrostatic latent image corresponding to the image information is formed on the photosensitive drum 1.

In Embodiment 1, the exposure device 10 irradiates the surface of the photosensitive drum 1 with the laser beam with a light amount of 0.45 $\mu J/cm^2$ so that a potential VL after the exposure of the surface of the photosensitive drum 1 becomes −100 V.

The electrostatic latent image formed on the photosensitive drum 1 is developed (visualized) by a toner as a developer supplied by the developing device 8, and a toner image (toner image, developer image) is formed on the photosensitive drum 1. The developing device 8 has a development roller 4 as a developer bearing member. The development roller 4 is a development member which is rotatable and supplies a toner to the photosensitive drum 1.

The development roller 4 forms a developing portion DS by contacting the surface of the photosensitive drum 1 with a predetermined contact pressure. On the development roller 4, a toner layer by the toner 3 charged to a predetermined polarity (negative polarity in Embodiment 1) is formed. To the development roller 4, a predetermined development voltage (development bias), which is a DC voltage, is applied from a development-voltage application circuit (not shown) as development-voltage applying means provided in the apparatus main body M. As a result, the toner 3 adheres to the electrostatic latent image on the photosensitive drum 1 in the developing portion DS, and the toner image is formed on the photosensitive drum 1.

In Embodiment 1, the development voltage of −400 V is applied to the development roller 4. And to an exposed portion (image portion) on the photosensitive drum 1 whose absolute value of potential has lowered by being exposed after being uniformly charging-processed, the toner 3 which was charged to the same polarity (negative polarity in Embodiment 1) as the charging polarity of the photosensitive drum 1 adheres (inversion development format). In Embodiment 1, a normal charging polarity of the toner 3, which is a major charging polarity of the toner 3 at development, is negative polarity.

The transfer roller 13 is brought into contact with the photosensitive drum 1 at a predetermined contact pressure and forms a transfer portion TS. The toner image formed on the photosensitive drum 1 is transferred onto the recording material P sandwiched and conveyed by the photosensitive drum 1 and the transfer roller 13 at the transfer portion TS. At the transfer, to the transfer roller 13, a predetermined transfer voltage (transfer bias), which is a DC voltage, is applied from a transfer-voltage application circuit (not shown) as transfer-voltage applying means. In Embodiment 1, a transfer voltage of +1500 V is applied to the transfer roller 13.

The recording material (transfer material, recording medium, sheet) P is supplied from a feeding portion 30 to the transfer portion TS. The feeding portion 30 is constituted by having a cassette 31 as a recording-material accommodating portion, a feeding roller 32 as a feeding member and the like. The recording material P accommodated in the cassette 31 is separated one by one and is sent out of the cassette 31 by the feeding roller 32 or the like. This recording material P is conveyed by a conveyance roller (resist roller) 50 as a conveyance member to the transfer portion TS synchronously at timing when the toner image on the photosensitive drum 1 reaches the transfer portion TS.

The recording material P to which the toner image has been transferred is conveyed to the fixing device 14 as fixing means. The fixing device 14 fixes (melts, causes to adhere) the toner image onto the recording material P by applying heat and a pressure to the recording material P. The recording material P to which the toner image has been fixed is discharged (output) onto a tray 40 as a discharging portion provided outside the apparatus main body M.

On the other hand, the toner which has not been transferred to the recording material P at the transfer portion TS at a transfer process and remains on the photosensitive drum 1 (untransferred toner) is removed from the photosensitive drum 1 as follows.

A surface part of the photosensitive drum 1 having passed the transfer portion TS after the transfer process is destaticized (destaticizing lamp) 11 so that a surface potential becomes 0 V and enters the charging portion ES. In the untransferred toner remaining on the photosensitive drum 1, toner charged in the positive polarity and toner charged in the negative polarity but not having sufficient electric charges are mixed. The untransferred toner is charged in the negative polarity by discharge in the charging portion ES.

The untransferred toner charged in the negative polarity in the charging portion ES reaches the developing portion DS with rotation of the photosensitive drum 1. Here, on the surface part of the photosensitive drum 1 having reached the developing portion DS, an electrostatic latent image according to the image information is formed. The untransferred toner adhering to a non-exposed part (non-image part) on the photosensitive drum 1 moves from the photosensitive drum 1 to the development roller 4 by a potential difference between the potential VD before exposure on the photosensitive drum 1 and the development voltage at the developing portion DS and is recovered in a development chamber **8*b* of the developing device 8. As described above, the untransferred toner on the photosensitive drum 1, which has not been transferred to the recording material P at the transfer portion TS, is recovered by the developing device 8 Note that the toner recovered in the development chamber 8*b*** is used for image formation again.

On the other hand, the untransferred toner adhering to the exposure part (image part) on the photosensitive drum 1 does not move from the photosensitive drum 1 to the development roller 4 at the developing portion DS but constitutes the toner image together with the toner having moved from the development roller 4 to the photosensitive drum 1. And this toner is transferred onto the recording material P at the transfer portion TS and is removed from the photosensitive drum 1.

Moreover, the brush member 12 as a paper-powder recovering member for removing power-powder fibers generated from the recording material P and adhering to the photosensitive drum 1 from the recording material P at the transfer process is provided. The brush member 12 is disposed so as to contact the photosensitive drum 1 on a downstream side of the transfer portion TS in a rotating direction of the photosensitive drum 1 and on an upstream side of the charging portion ES. The brush member 12 catches the paper-powder fibers on the photosensitive drum 1 and removes them from on the photosensitive drum 1 by frictionally sliding on the surface of the photosensitive drum 1 with rotation of the photosensitive drum 1.

Note that the image forming apparatus 100 according to Embodiment 1 does not have a development contact/separation mechanism which enables contact between the development roller 4 and the photosensitive drum 1 at appropriate time but is configured that the development roller 4 and the photosensitive drum 1 are in contact all the time. Thus, Embodiment 1 is configured such that the voltage applying portion can apply a voltage in a polarity opposite to the negative polarity from a power source for applying development voltage to the development roller 4. That is, it is so configured that, if the development is not to be performed, by applying the voltage in the positive polarity opposite to the negative polarity, which is the normal polarity of the toner, to the development roller 4, transfer of the toner to the photosensitive drum 1 is suppressed. As a result, the same effect can be obtained as the case where the development roller and the photosensitive drum are separated when the development is not performed in the image forming apparatus having the development contact/separation mechanism. Note that such a configuration having a development contact/separation mechanism in which the development roller 4 is capable of contacting and separating from the photosensitive drum 1 may be used.

Detailed Configuration of Major Members of Image Forming Apparatus

Subsequently, a detailed configuration of major members in the image forming apparatus 100 in Embodiment 1 will be explained.

Photosensitive Drum 1

In Embodiment 1, the photosensitive drum 1 has an OPC (Organic Photo Conductor) photosensitive layer formed on an outer peripheral surface of a cylindrical conductive drum. In Embodiment 1, the photosensitive drum 1 is a rigid body constituted by coating a resistance layer, an undercoating layer, a charge generation layer, and a charge transport layer in this order by a dipping coating method on an outer periphery of an aluminum cylinder with a diameter of 24 mm. In Embodiment 1, a film thickness of the charge transport layer is 22 μm.

Charging Roller 2

In Embodiment 1, the charging roller 2 is constituted by coating a hydrin rubber base layer and an urethane surface layer in this order so as to have an outer diameter of 12 mm on an outer periphery of a core metal with a diameter of 6 mm. Moreover, in Embodiment 1, an electric resistance value of the charging roller 2 is $1\times10^{6}\Omega$ or less, and hardness of the charging roller 2 was, when measured by Asker C rubber hardness tester by KOBUNSHI KEIKI CO., LTD., 40 degrees.

Exposure Device 10

In Embodiment 1, the exposure device 10 is a scanner unit capable of changing a light amount of a laser beam with which the surface of the photosensitive drum 1 is irradiated. A wavelength of the laser beam emitted by the exposure device 10 is 800 nm. Moreover, in Embodiment 1, a light source of the exposure device 10 is a semiconductor laser.

Transfer Roller 13

In Embodiment 1, the transfer roller 13 is constituted by providing a base layer of an ion conductive sponge on an outer periphery of a core metal with a diameter of 6 mm so that an outer diameter becomes 15 mm. Moreover, in Embodiment 1, in an environment with a temperature of 22° C., the electric resistance value of the transfer roller 13 is $4\times10^{7}\Omega$, and the hardness was, when measured by Asker C rubber hardness tester by KOBUNSHI KEIKI CO., LTD., 30 degrees.

Developing Device 8

In Embodiment 1, the developing device 8 is a one-component contact developing device using a non-magnetic one-component developer (toner) as a developer. The developing device 8 has a development container (frame body) 80 constituted by including the development chamber **8*b* as a development-member accommodating chamber (development-member accommodating portion) and a toner accommodating chamber 8*a* as a developer accommodating chamber (developer accommodating portion). The development chamber 8*b* and the toner accommodating chamber 8*a*** communicate with each other via an opening portion.

In the development chamber **8*b*, the development roller 4, a supply roller 5 as a supply member, and a development blade 6 as a regulating member are provided. The development roller 4 is disposed rotatably at the opening portion of the development chamber 8*b* (development container 80) and conveys the toner 3 from inside to the outside of the development chamber 8*b* (development container 80) by rotating while bearing the toner 3. The supply roller 5 supplies the toner 3 to the development roller 4. The development blade 6 regulates a toner amount on the development roller 4 while giving charges in a predetermined polarity to the toner 3 on the development roller 4**.

In the toner accommodating chamber **8*a*, the toner 3 as the developer is accommodated. Moreover, in the toner accommodating chamber 8*a*, an agitating member 7 for conveying the toner 3 from the toner accommodating chamber 8*a* to the development chamber 8*b*, while agitating the toner 3 in the toner accommodating chamber 8*a***, is provided.

Note that, in Embodiment 1, the contact development method in which the photosensitive drum 1 and the development roller 4 are disposed in contact with each other is used for the developing device 8, but this is not limiting. The developing device 8 may use a two-component development method using a two-component developer or a non-contact development method in which the photosensitive drum 1 and the development roller 4 are disposed by opposing each other with a predetermined gap.

In Embodiment 1, the development roller 4 is constituted by coating a base layer of silicone rubber and a surface layer of urethane rubber in this order on an outer periphery of a core metal with a diameter of 6 mm so that an outer diameter becomes 15 mm. Moreover, in Embodiment 1, an electric resistance value of the development roller 4 is $1\times10^{4}$ to $1\times10^{12}\Omega$.

In Embodiment 1, the supply roller 5 is a conductive elastic sponge roller constituted by forming a foaming body layer on an outer periphery of a core metal with a diameter of 6 mm. Moreover, in Embodiment 1, an electric resistance value of the supply roller 5 is $1\times10^{4}$ to $1\times10^{8}\Omega$, and the hardness is 200 gf. Note that the hardness of the supply roller 5 is a value obtained by measuring a load when a flat plate with a longitudinal width of 50 mm is caused to intrude by 1 mm from the surface of the supply roller 5.

In Embodiment 1, the development blade 6 is a SUS sheet metal made of metal with a thickness of 0.1 mm, having predetermined lengths in a longitudinal direction disposed along a rotation axis direction of the development roller 4 and a short direction substantially orthogonal to the longitudinal direction. With respect to this development blade 6, a free end in the short direction is directed to an upstream side in a rotating direction of the development roller 4 and a side surface in the vicinity of the free end is disposed in contact with the development roller 4 along the longitudinal direction. In Embodiment 1, for the development blade 6, the one obtained by cutting and machining a distal end (free end) of the SUS sheet metal from a contact surface side with respect to the development roller 4 was used. A distal end part of the development blade 6 is curved in the cutting direction by the cutting and machining, and a curved amount at the distal end of the development blade 6 corresponding to a radius of curvature R is 0.02 mm.

Movement of the toner 3 in the developing device 8 being driven will be explained. In the developing device 8, a drive force is transmitted from a drive motor (not shown) as a drive source constituting driving means provided in the apparatus main body M. As a result, the development roller 4 rotates in an arrow A2 direction (clockwise direction) in the drawing, the supply roller 5 in an arrow A3 direction (clockwise direction) in the drawing, and the agitating member 7 in an arrow A4 direction (counterclockwise direction) in the drawing. Note that the drive source of the photosensitive drum 1 and each rotating member of the developing device 8 (development roller 4, supply roller 5, agitating member 7) may be made common.

When the agitating member 7 in the toner accommodating chamber **8*a* rotates, the toner 3 in the toner accommodating chamber 8*a* is agitated and also conveyed toward the supply roller 5 in the development chamber 8*b*. The toner 3 held by the foaming body layer of the supply roller 5 is sent to a contact portion with the development roller 4 by rotation of the supply roller 5. Then, the toner 3 having reached this contact portion is brought into sliding contact by the surface of the development roller 4 and the surface of the supply roller 5 moving in directions opposite to each other in this contact portion and a part thereof adheres to the surface of the development roller 4**.

The toner 3 adhering to the surface of the development roller 4 is sent to a contact portion with the development blade 6 with rotation of the development roller 4. The development blade 6 forms a uniform thin layer by regulating an amount of the toner 3 adhering to the surface of the development roller 4 and frictionally charges the toner 3. The toner 3 made into a thin layer is sent to a contact portion with the photosensitive drum 1 (developing portion DS) with rotation of the development roller 4 and is used for developing an electrostatic latent image formed on the photosensitive drum 1. The toner 3 not used for the development but remaining on the surface of the development roller 4 is conveyed to the contact portion with the supply roller 5 and is removed by the supply roller 5 from the surface of the development roller 4. The removed toner 3 is sent into the toner accommodating chamber 8*a* and is agitated and mixed with the toner 3 in the toner accommodating chamber 8*a*.

Toner Amount Sensor

Figure 2:
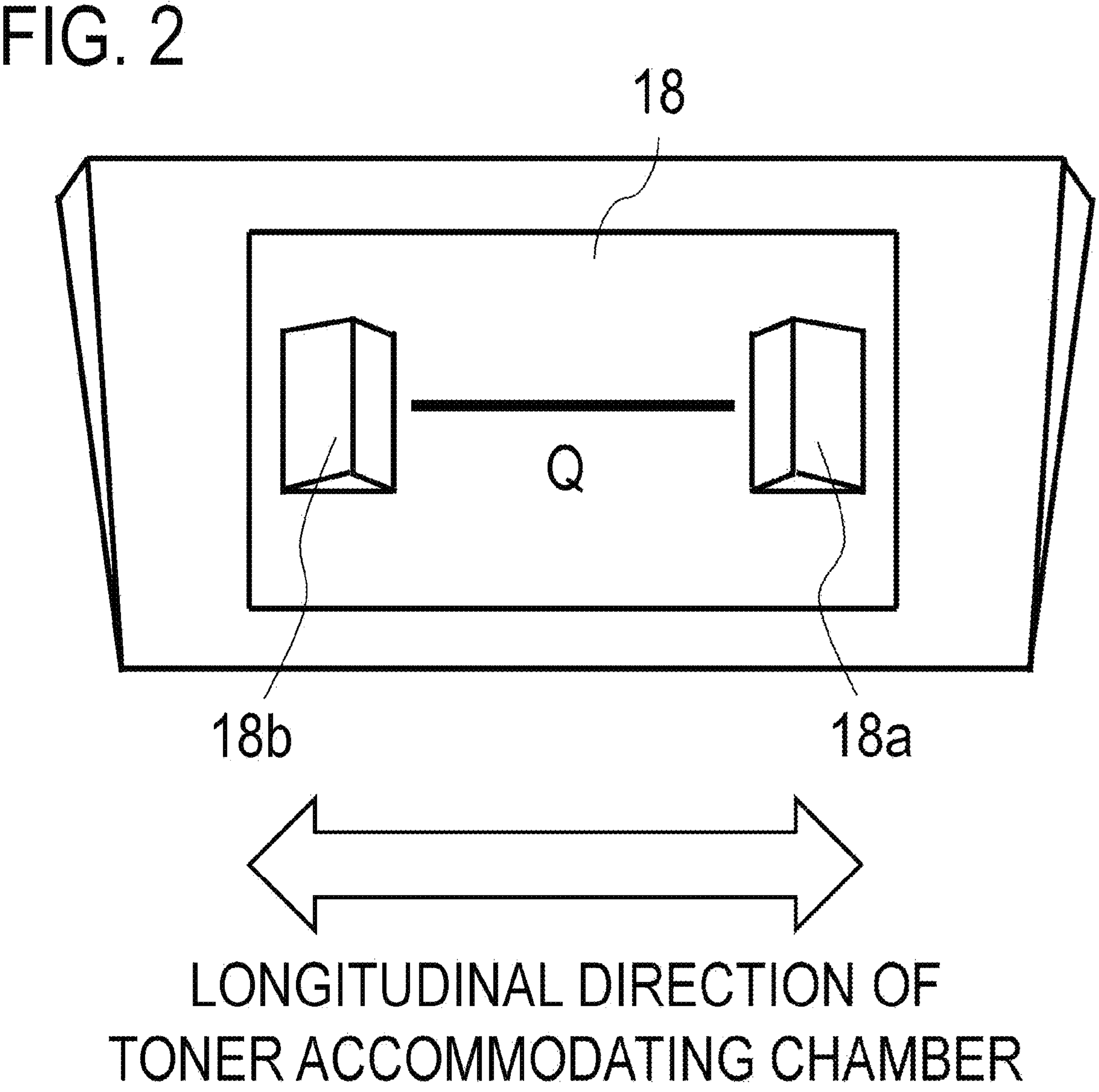
FIG. 2 is a schematic front view of a lightguide member of Embodiment 1.
Figure 3:
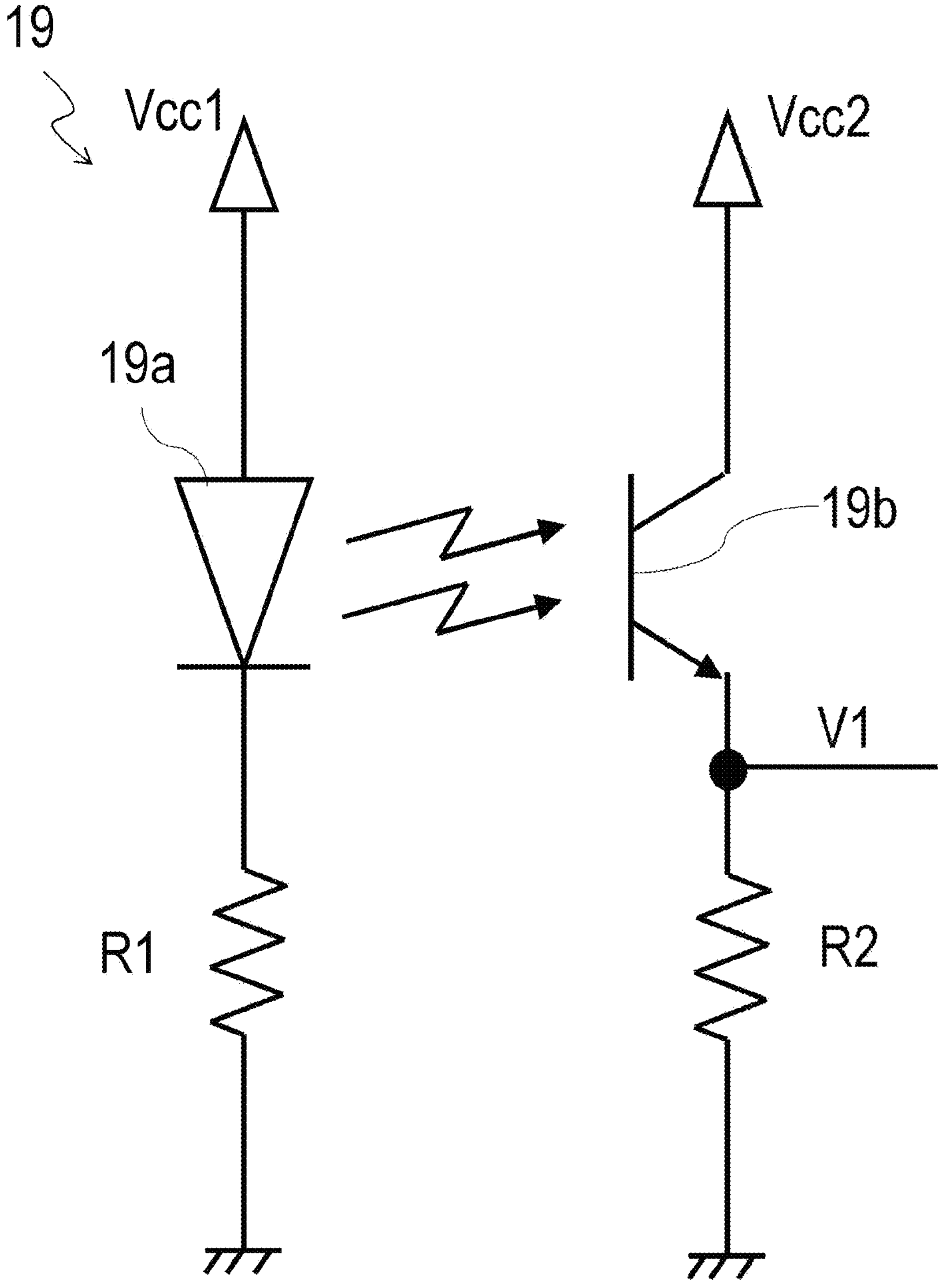
FIG. 3 is a circuit diagram of a sensor portion of Embodiment 1.
Figure 4:
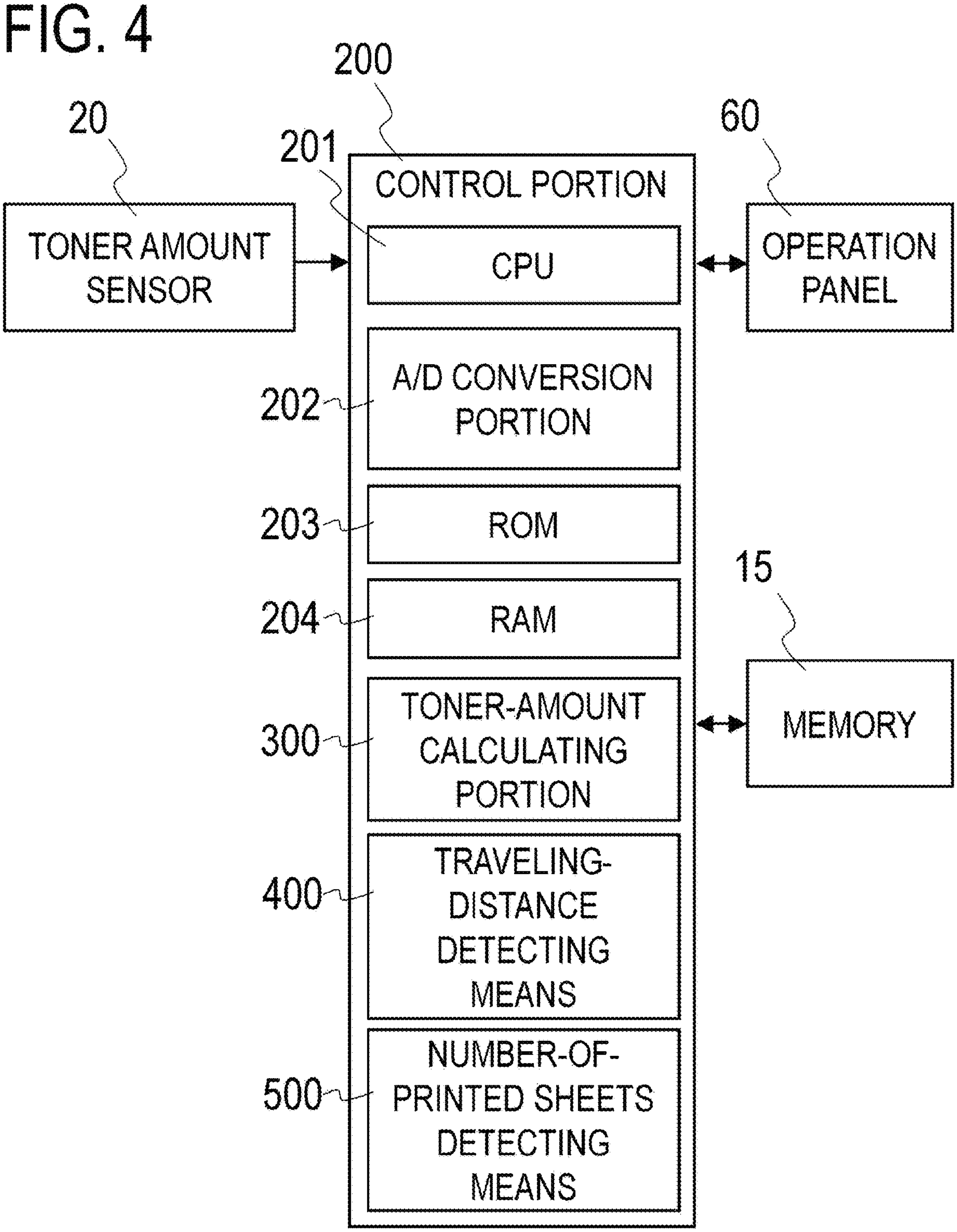
FIG. 4 is a schematic block diagram illustrating a control system of the image forming apparatus of Embodiment 1.

Subsequently, a toner amount sensor 20 as developer-amount detecting means for detecting a toner amount (toner residual amount) in the developing device 8 in Embodiment 1 will be explained. The toner amount sensor 20 is an optical sensor constituted by a lightguide member 18 and a sensor portion 19. FIG. 2 is a schematic front view of the lightguide member 18 in Embodiment 1. FIG. 3 is a circuit diagram of the sensor portion 19 in Embodiment 1. FIG. 4 is a schematic block diagram illustrating a control system of the image forming apparatus 100 in Embodiment 1.

As shown in FIG. 1, in the developing device 8, the lightguide member 18 constituting the toner amount sensor 20 is provided. As shown in FIG. 2, the lightguide member 18 has a light-emission side lightguide portion 18*a* and a light-receiving side lightguide portion 18*b*. The light-emission side lightguide portion 18*a* guides light emitted from a light emitting element 19*a* of the sensor portion 19, which will be described later, into the development container 80. The light-receiving side lightguide portion 18*b* guides light having passed through a space optical path Q inside the light-emission side lightguide portion 18*a* and the development container 80 to a light receiving element 19*b* of the sensor portion 19, which will be described later.

Moreover, as shown in FIG. 1, in the developing device 8, the sensor portion 19 constituting the toner amount sensor 20 is provided. As shown in FIG. 3, the sensor portion 19 has the light emitting element 19*a* as a light emitting portion which emits light and the light receiving element 19*b* as a light receiving portion which receives light emitted from the light emitting element 19*a*. Moreover, the sensor portion 19 has a board (not shown) on which the light emitting element 19*a* and the light receiving element 19*b* are provided. In Embodiment 1, an LED is used as the light emitting element 19*a*, and a phototransistor is used as the light receiving element 19*b*. This phototransistor is brought into an ON state by light from the LED. Moreover, a cable connector (not shown) is provided on the board. The sensor portion 19 is connected by a cable with the control portion 200, which will be described later, provided in the apparatus main body M of the image forming apparatus 100 via this cable connector.

Subsequently, disposition of the toner amount sensor 20 in Embodiment 1 will be explained. The toner amount sensor 20 constituted by the lightguide member 18 and the sensor portion 19 is disposed on a side surface of the toner accommodating chamber 8*a* of the development container 80. In Embodiment 1, the toner amount sensor 20 (the lightguide member 18 and the sensor portion 19) is provided at a center portion in the longitudinal direction (rotation axis direction of the development roller 4) of the toner accommodating chamber 8*a* (development container 80). The toner inside the toner accommodating chamber 8*a* is unevenly distributed in the longitudinal direction of the toner accommodating chamber 8*a* in some cases, but uneven distribution of the toner is smaller at the center portion in the longitudinal direction of the toner accommodating chamber 8*a*. Therefore, by providing the toner amount sensor 20 (the lightguide member 18 and the sensor portion 19) at the center portion in the longitudinal direction of the toner accommodating chamber 8*a*, the toner amount with an influence of the uneven distribution of the toner suppressed can be detected.

Subsequently, a detecting method of a toner amount by the toner amount sensor 20 will be explained. In FIG. 3, a switch (not shown) is provided between the light emitting element 19*a* and a power-source voltage Vcc1, and when this switch is brought into an ON state, a voltage is applied from the power-source voltage Vcc1 to the light emitting element 19*a*, and the light emitting element 19*a* is brought into a conductive state. On the other hand, a switch (not shown) is provided also between the light receiving element 19*b* and the power-source voltage Vcc, and when this switch is brought into an ON state, the light receiving element 19*b* is brought into a conductive state, and an electric current according to a light amount detected by the light receiving element 19*b* flows.

To the light emitting element 19*a*, the power-source voltage Vcc1 and a current-limiting resistor R1 are connected, and the light emitting element 19*a* emits light by an electric current determined by the current-limiting resistor R1. The light emitted from the light emitting element 19*a* passes through the space optical path Q and is received by the light receiving element 19*b*. To a collector terminal of the light receiving element 19*b*, the power-source voltage Vcc2 is connected, and a detection resistor R2 is connected to an emitter terminal of the light receiving element 19*b*. The light receiving element 19*b*, which is a photo transistor, receives the light emitted from the light emitting element 19*a* and outputs a signal (electric current) according to the received light amount. This signal is converted by the detection resistor R2 to a voltage and is input to an A/D converting portion 202, which will be described later, of the control portion 200. That is, the light receiving element 19*b* changes an output value in accordance with the toner amount accommodated in the toner accommodating chamber 8*a*. To the toner amount sensor 20, electricity is supplied from a power source provided in the apparatus main body M.

A toner-amount calculating portion 300, which will be described later, of the control portion 200 determines whether or not the light receiving element 19*b* has received the light from the light emitting element 19*a* on the basis of a voltage level input by the toner amount sensor 20 into the control portion 200 and converted by the A/D converting portion 202 into a digital signal. Then, the toner-amount calculating portion 300 calculates a length of time during which the toner amount sensor 20 detects the light, when the toner in the development container 80 is agitated by the agitating member 7 for a predetermined period of time. In a ROM 203, which will be described later, of the control portion 200, a toner-amount determination information for determining (calculating, predicting, presuming) the toner amount is stored in advance as a table indicating a relation between the aforementioned time and the toner amount. And the toner-amount calculating portion 300 calculates the toner amount in the development container 80 on the basis of a voltage level input into the control portion 200 by the toner amount sensor 20 and converted by the A/D converting portion 202 and the information of the aforementioned table.

More specifically, the space optical path Q of the toner amount sensor 20 is set so as to intersect with a rotation locus of the agitating member 7, when viewed from a rotation axis direction of the agitating member 7 in the toner accommodating chamber 8*a*. And the time during which the space optical path Q is shielded by the toner conveyed by the agitating member 7, when the agitating member 7 rotates once, that is, the time during which the light receiving element 19*b* does not detect the light from the light emitting element 19*a* changes depending on the toner residual amount. Moreover, light receiving intensity at the light receiving element 19*b* also changes depending on the toner residual amount.

That is, when the toner residual amount is small, the time during which the space optical path Q is shielded by the toner 3 is short and thus, the time during which the light receiving element 19*b* receives light becomes longer, and the light receiving intensity of the light received by the light receiving element 19*b* becomes larger. On the other hand, when the toner residual amount is large, the time during which the light receiving element 19*b* receives light becomes shorter to the contrary, and the light receiving intensity of the light received by the light receiving element 19*b* becomes weak. Therefore, the control portion 200 can determine the toner residual amount level on the basis of the light receiving time or light receiving intensity of the light receiving element 19*b* as described above.

The toner-amount calculating portion 300 causes the toner amount in the development container 80 calculated on the basis of the detection result by the toner amount sensor 20 to be stored in the memory 15. Note that, in Embodiment 1, in the memory 15, a toner residual amount T accommodated in the toner accommodating chamber 8*a* when the developing device 8 (process cartridge 9) is new (beginning of use, unused state) is stored in advance as a toner initial residual-amount T0.

In Embodiment 1, when the image forming operation is performed, the toner residual amount T1 recently detected by the toner amount sensor 20 at the end of the image forming operation is calculated by the toner-amount calculating portion 300. And when the calculated toner residual amount T1 is smaller than the toner residual amount T stored in the memory 15, the toner-amount calculating portion 300 updates the toner residual amount T stored in the memory 15 to T1 (to be stored as T=T1 in the memory 15).

Note that, a detecting/presuming method of the toner residual amount is not limited to the aforementioned optical toner residual-amount detection system but various well-known detecting/presuming methods of the toner residual amount can be used. For example, the toner residual amount may be detected/presumed by disposing two or more metal plates or conductive resin sheets extending in the development-roller longitudinal direction on an inner wall of the development container 80, which is a frame body, and by measuring electrostatic capacity between the two metal plates or conductive resin sheets. Alternatively, a load cell is provided in such a form that supports the developing device 8 from below so that a CPU 201, which will be described later, subtracts a weight of the developing device 8 when the toner is empty from the weight measured by the load cell so that the toner residual amount is calculated. Moreover, the toner residual amount is detected by one sensor of the optical toner residual-amount detection system in this Embodiment, but the toner residual amount may be detected by a plurality of sensors.

Control Configuration

As shown in FIG. 4, in the apparatus main body M of the image forming apparatus 100, the control portion 200 as control means is provided. The control portion 200 is constituted by having the CPU 201 as arithmetic processing means, which is a central element executing the arithmetic processing, the A/D converting portion 202, the ROM 203 and a RAM 204 as storage means (storage medium), an input/output circuit (not shown) and the like. The A/D converting portion 202 converts an analog signal input into the control portion 200 to a digital signal. In the ROM 203, a control program, a data table acquired in advance and the like are stored. In the RAM 204, information input into the control portion 200, detected information, calculation results and the like are stored. The input/output circuit controls input/output of a signal between the control portion 200 and devices connected thereto.

To the control portion 200, each portion (various driving devices, various power sources, various sensors and the like) of the image forming apparatus 100 is connected. The control portion 200 controls an operation of each portion by bilaterally communicating with each portion of the image forming apparatus 100. The control portion 200 performs an image forming operation by controlling each part of the image forming apparatus 100 on the basis of a signal (start signal, image signal) input from an external device (not shown) such as a personal computer in accordance with an operation by an operator (user).

Moreover, in the control portion 200, the toner-amount calculating portion 300 is provided. The toner-amount calculating portion 300 calculates a toner amount (toner residual amount) in the development container 80 on the basis of the detection result by the toner amount sensor 20 as described above. In Embodiment 1, the toner-amount calculating portion 300 is realized by the CPU 201 executing a program stored in the ROM 203.

Moreover, in the control portion 200, a traveling-distance detecting device 400 as development-roller traveling-distance detecting means is provided. The traveling-distance detecting device 400 counts a traveling distance of the development roller 4 and is realized by the CPU 201 executing a program stored in the ROM 203. The traveling distance of the development roller 4 counted by the traveling-distance detecting device 400 is stored as an accumulated traveling distance R0 in the memory 15. The traveling distance is a movement distance of the surface of the development roller 4, and the accumulated traveling distance R0 is an accumulated movement distance of the surface of the development roller 4. Note that, when the developing device 8 is new, R0=0.

Moreover, in the control portion 200, number-of-printed sheets detecting means 500 for detecting the number of formed images (number of printed sheets) of the recording material P for which the image forming operation was performed is provided. The number-of-printed sheets detecting means 500 counts the number of image-forming operations since the apparatus was new, which is realized by the CPU 201 executing a program stored in the ROM 203. The number of image-forming operations counted by the number-of-printed sheets detecting means 500 is stored as an accumulated number N0 of printed sheets in the memory 15. Note that, when the developing device 8 is new, N0=0.

Moreover, which of the normal print mode, which will be described later, or the text print mode, the print mode which is currently set (in use) is in is recorded in the memory 15.

Toner Stains on Charging Roller

As described above, the untransferred toner remaining on the surface of the photosensitive drum 1 at the transfer process is brought into contact with the charging portion ES, which is a contact portion between the photosensitive drum 1 and the charging roller 2, prior to the developing portion DS. In the configuration as above, in a case where the developing device 8 is new, long time has elapsed since last printing, the toner has deteriorated due to repeated image forming operations or the like, the charging roller 2 might be stained in some cases.

The aforementioned phenomenon will be explained in detail. In the aforementioned case, if electrification characteristic of the toner in the toner accommodating chamber 8*a* is low, the toner cannot be held on the surface of the development roller 4 only by a potential difference formed between the photosensitive drum 1 and the development roller 4, and the toner amount moving onto the surface of the photosensitive drum 1 becomes larger. Such a phenomenon that the toner moves onto the surface of the photosensitive drum 1 with respect to the potential difference formed between the potential VD before exposure of the photosensitive drum 1 and a development voltage is called fogging, and the toner having moved onto the surface of the photosensitive drum 1 at the fogging is called a fogging toner. Since the fogging toner having moved onto the photosensitive drum 1 as above has low electrification characteristic, even if a potential difference formed between the charging roller 2 and the photosensitive drum 1 is made such a potential difference at which the toner in the negative polarity hardly moves to the charging roller 2 side, the fogging toner stains the charging roller 2. If a stain amount of the charging roller 2 by the fogging toner is large, a difference in a staining degree becomes large depending on a position on the charging roller 2 surface due to factors such as a shape of the charging roller 2, a contact pressure between the charging roller 2 and the photosensitive drum 1, roughness of the charging roller 2 surface layer and the like. This difference in the staining degree incurs potential non-uniformity of the potential VD before exposure and causes generation of an image with image density non-uniformity having a cycle of the charging roller 2.

Cleaning Operation on Charging Roller Surface

Figure 5:
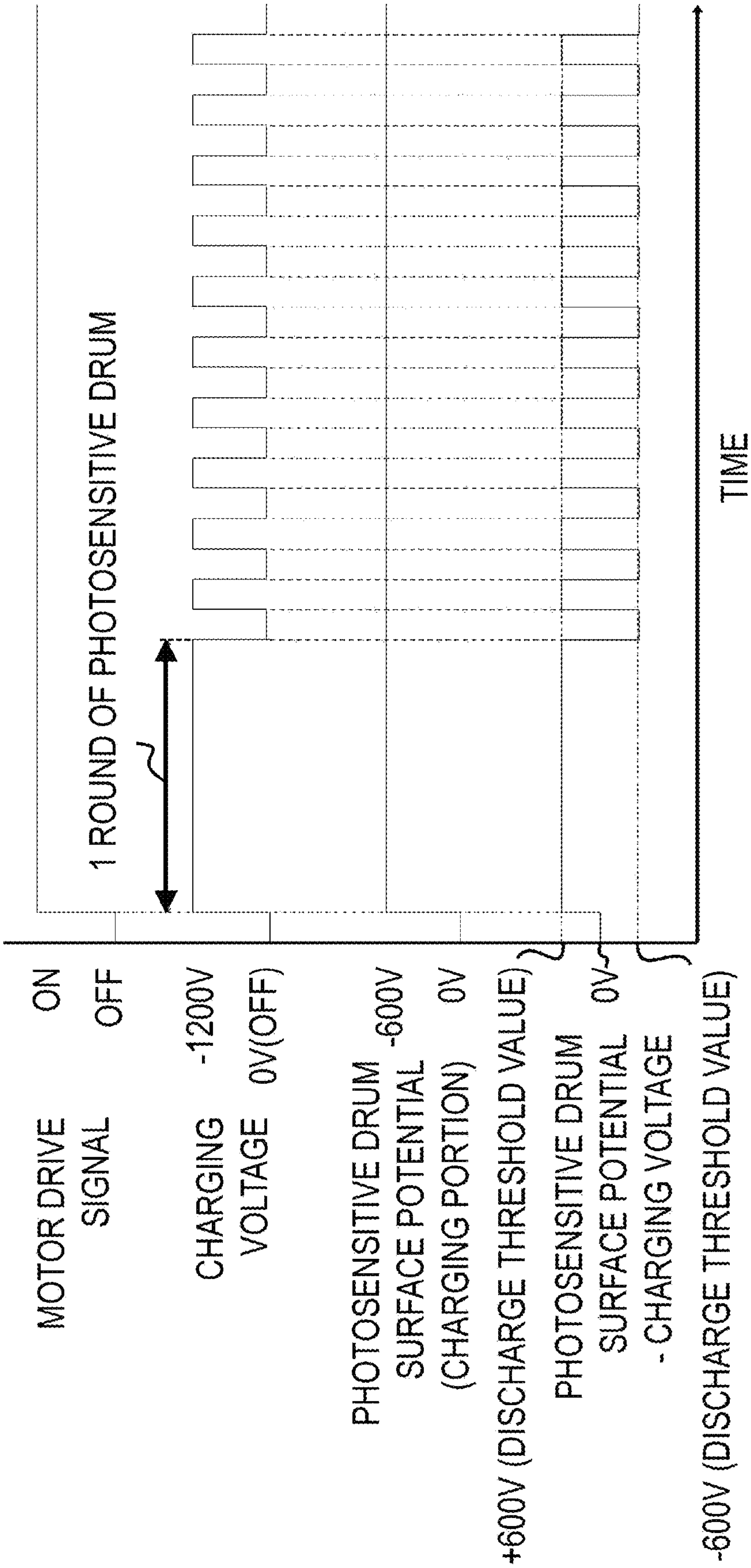
FIG. 5 is a diagram illustrating a cleaning operation of a charging roller of Embodiment 1.

Subsequently, cleaning operation control in Embodiment 1 will be explained. In order to facilitate understanding of various types of potential control in the cleaning operation control in Embodiment 1, explanation will made by using FIG. 5. FIG. 5 is a diagram illustrating the cleaning operation of the charging roller 2 in the image forming apparatus 100 in Embodiment 1. In FIG. 5, a temporal change of each of a drive signal of a motor, a charging voltage applied to the charging roller 2, a surface potential in the charging portion ES of the photosensitive drum 1, and a difference between the surface potential of the photosensitive drum 1 and the charging voltage applied to the charging roller 2 is shown in order from top. Note that the motor for which the drive signal is shown in FIG. 5 is a motor of a driving portion which drives the photosensitive drum 1, the charging roller 2, and the development roller 4. Moreover, a lateral axis of FIG. 5 is time.

In the cleaning operation, first, −1200 V is applied to the charging roller 2 only by a portion of a length corresponding to one round of the photosensitive drum 1, and the charging roller 2 charges the surface of the photosensitive drum 1 to −600 V. After that, an operation of applying two voltages, that is, −1200 V and 0 V (OFF) alternately 10 times each to the charging roller 2 is performed. By giving a potential difference of 600 V to each of a toner in a positive polarity and a toner in a negative polarity to the surface potential of −600 V of the photosensitive drum 1, the toner is moved from the charging roller 2 to the surface of the photosensitive drum 1. When the toner in the both positive and negative polarities on the surface of the charging roller 2 is moved to the photosensitive drum 1 side by the potential difference formed between the surface of the photosensitive drum 1 and the charging roller 2, the toner stain amount on the surface of the charging roller 2 is decreased. The toner having moved to the photosensitive drum 1 is recovered by the development roller 4 after that and is accommodated in the developing device 8.

As described above, in the cleaning operation, the charging voltage of 0 V, which is larger than the surface potential of the photosensitive drum 1, and the charging voltage of −1200 V, which is smaller, are alternately applied to the charging roller 2 by a charging-voltage application circuit. By periodically performing the cleaning operation as above, the toner stain amount of the charging roller 2 is decreased, and generation of an image with image density non-uniformity having a generation cycle in a halftone image or the like can be suppressed.

If the cleaning operation of the charging roller surface is performed with a high frequency, an effect to suppress image density non-uniformity generated in a halftone image is improved, while a development drive distance with respect to the number of printed sheets increases and thus, toner deterioration progresses. Particularly in a case where image formation with a small amount of toner use with respect to the number of printed sheets is mainly performed such that a halftone image or the like is not printed, progress of the toner deterioration degree is remarkable. That is, the highly frequent cleaning operation can suppress generation of image density non-uniformity of the halftone image, while there is a concern that defective images such as fogging images on a white background part caused by a lowered charging amount of the toner due to progress of the toner deterioration could occur at an early stage.

Moreover, in such a configuration that the photosensitive drum 1 and the development roller 4, the supply roller 5 and the like are synchronously driven by a common drive source, each time the cleaning operation is performed, drive time of the developing device 8 is prolonged, and the toner deterioration can progress particularly easily. However, for a user who does not perform print of an image such as a halftone image that image density non-uniformity can often matter, the cleaning operation does not necessarily have to be performed.

Thus, in the image forming apparatus 100 of Embodiment 1 is configured capable of performing two modes, that is, a first mode and a second mode as print modes (image forming modes). The first mode is a normal print mode with a major purpose of not generating image density non-uniformity of a halftone image by periodically performing the cleaning operation of the charging roller surface. Here, the term periodically refers to every predetermined number of jobs, every predetermined drive time, every start of the image forming apparatus 100 or the like, for example. The second mode is a text print mode with a major purpose of excluding the periodic cleaning operation of the charging roller surface and suppressing progress of the toner deterioration. For the user who can allow generation of image density non-uniformity on a halftone image, generation of a fogging image can be suppressed by using the text print mode.

In the text image, a toner consumption amount is smaller than that of the halftone images and the like in general, and a print percentage is lower. Therefore, the text print mode can be also referred to as a low print-percentage mode or a low consumption mode.

The print percentage can be detected by measuring means (pixel count) capable of counting the number of pixels (pixel) of light emitted by the scanner unit of the exposure device 10. The measuring means of the print percentage may be configured by the control portion 200 or may be provided separately from the control portion 200. The pixel count is to count individual image signals forming an image dot of an image to be formed. A toner amount required for developing an image is estimated to be a toner consumption amount used by print per sheet of paper from the number of pixels of the light emitted by the scanner unit by the control portion 200.

Note that, detecting means of the print percentage is not limited to the aforementioned print-percentage detection system by pixel count. For example, when the image forming apparatus 100 is configured capable of replenishing the toner by using a toner pack or the like, the detection may be made from a detection result of the development container weight at the previous toner replenishment timing, a detection result of the current development container weight, and the number of passed sheets during that period.

Figure 6:
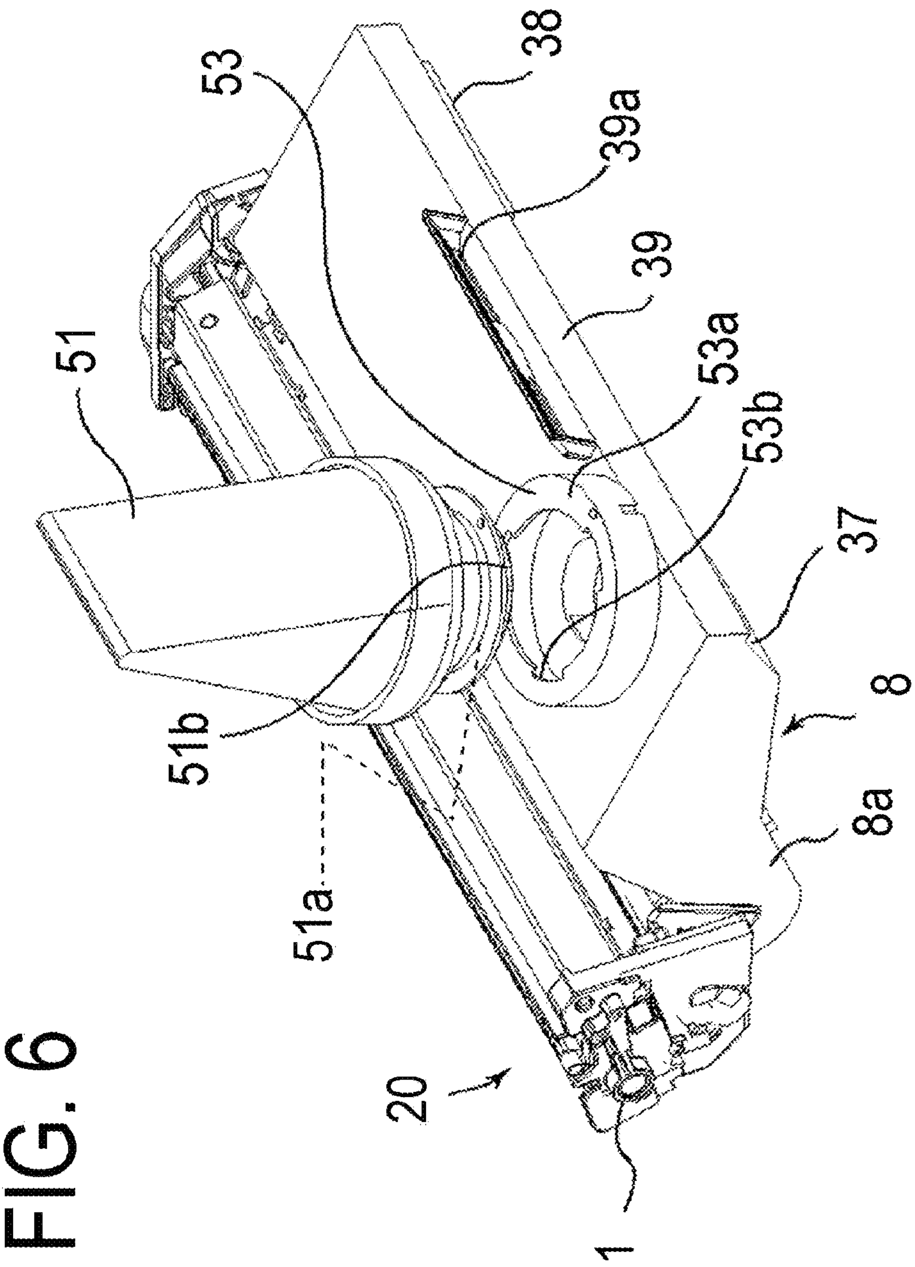
FIG. 6 is a perspective view of a development device which can replenish a toner.

Hereinafter, an example of a toner replenishment configuration of the image forming apparatus 100 constituted capable of toner replenishment will be explained. The image forming apparatus 100 is constituted capable of the toner replenishment by such a configuration that a replenishment port 53*a* for replenishment of the developer to the toner accommodating chamber 8*a* is formed in the developing device 8, for example. FIG. 6 is a perspective view of the developing device 8 of the image forming apparatus 100 constituted capable of toner replenishment.

The developing device 8 shown in FIG. 6 has a first projecting portion 37 as a projecting portion projecting upward from one end part in a longitudinal direction of the toner accommodating chamber 8*a* and communicating with the toner accommodating chamber 8*a*, a second projecting portion 38 projecting upward from the other end part in the longitudinal direction of the toner accommodating chamber 8*a*. On an upper end part (distal end part) of the first projecting portion 37, an attachment portion 53 capable of attachment of a toner pack 51 is provided, and in the attachment portion 53, the replenishment port 53*a* for replenishment of the developer from the toner pack 51 to the toner accommodating chamber 8*a* is formed. To the attachment portion 53, the toner pack 51 can be attached in a state exposed to the outside of the device. It is particularly preferable that the developing device 8 is constituted so that the toner replenished through the replenishment port 53*a* reaches the agitating member 7 by its own weight only from a viewpoint of workability of the toner replenishment.

Moreover, the developing device 8 includes a gripping portion 39 having a tab portion 39*a* which can be grasped by a user by hooking the finger. The tab portion 39*a* is formed by projecting upward from a top surface of the gripping portion 39. The first projecting portion 37 is formed with a hollow-shape inside, and the replenishment port 53*a* is formed in an upper surface. Moreover, the space inside the first projecting portion 37 communicates with the toner accommodating chamber 8*a*. The replenishment port 53*a* is constituted capable of being connected to the toner pack 51.

The toner pack 51 is constituted to be detachably attached to the attachment portion 53 of the first projecting portion 37. Moreover, the toner pack 51 has a shutter member 51*a* provided at the opening portion and capable of being opened/closed and a plurality of (three in this Embodiment) projections 51*b* formed correspondingly to a plurality of (three in this Embodiment) groove portions 53*b* formed in the attachment portion 53. When the user replenishes the developing device 8 with the toner, positioning is performed so that the projection 51*b* of the toner pack 51 passes through the groove portion 53*b* of the attachment portion 53, and the toner pack 51 is connected to the attachment portion 53. And by rotating the toner pack 51 by 180 degrees in this state, the shutter member 51*a* of the toner pack 51 abuts against an abutting portion, not shown, of the attachment portion 53 and rotates with respect to the main body of the toner pack 51, and the shutter member 51*a* is opened. As a result, the toner accommodated in the toner pack 51 leaks down from the toner pack 51, and the toner having leaked down enters the hollow-shaped first projection portion 37 through the replenishment port 53*a*. Note that the shutter member 51*a* may be provided on the replenishment port 53*a* side. The present application invention can be applied also to the image forming apparatus 100 configured as above.

Changing Operation of Print Mode

Subsequently, a print mode change based on a traveling distance of the development roller 4 (also called surface movement distance, rotation number, rotation distance and the like) and a use amount of the toner will be explained. In Embodiment 1, the print mode is set to the normal print mode in initial setting. And the control portion 200 is configured capable of proposing a change of the print mode from the normal print mode to the text print mode on the basis of developer amount information related to an amount of the toner 3 accommodated in the toner accommodating chamber 8*a* and development drive information related to the movement distance of the surface of the development roller 4.

In Embodiment 1, the developer amount information is the toner residual amount T and the toner initial residual-amount T0 accommodated in the toner accommodating chamber 8*a* and is acquired by the toner amount sensor 20 as a first acquiring portion. Moreover, the development drive information is the accumulated traveling distance R0 of the development roller 4 and is acquired by the traveling-distance detecting device 400 as a second acquiring portion. Hereinafter, a method of proposing a change of the print mode will be explained in more detail on the basis of the information as above.

In Embodiment 1, at the time when the accumulated number N0 of printed sheets reaches a predetermined number of printed sheets, if a ratio of the toner use amount with respect to the traveling distance of the development roller 4 (=toner use rate TR) falls under a threshold value, a change from the normal print mode to the text print mode is prompted. That is because the fact that the toner use rate TR is low is considered to be that the text print whose toner consumption amount is smaller than that of the halftone image in general is mainly performed, and it is highly likely that the cleaning operation of the charging roller 2 is performed excessively.

The toner use rate (developer use rate) TR is calculated from the accumulated traveling distance R0 of the development roller 4 stored in the memory 15 and the toner use amount since the developing device 8 was new. The toner use amount can be calculated from a difference between the toner initial residual-amount T0 stored in the memory 15 in advance and the toner residual amount T calculated by the toner-amount calculating portion 300. In Embodiment 1, the toner use rate TR is calculated by TR=(T0−T)/R0. Note that the toner initial residual-amount T0 is a toner residual amount when the developing device 8 is new.

In Embodiment 1, at the time when the accumulated number N0 of printed sheets reaches 5000, if the toner use rate TR falls under 1.5 μg/mm, the change of the print mode from the normal print mode to the text print mode (switching) is prompted.

Figure 7:
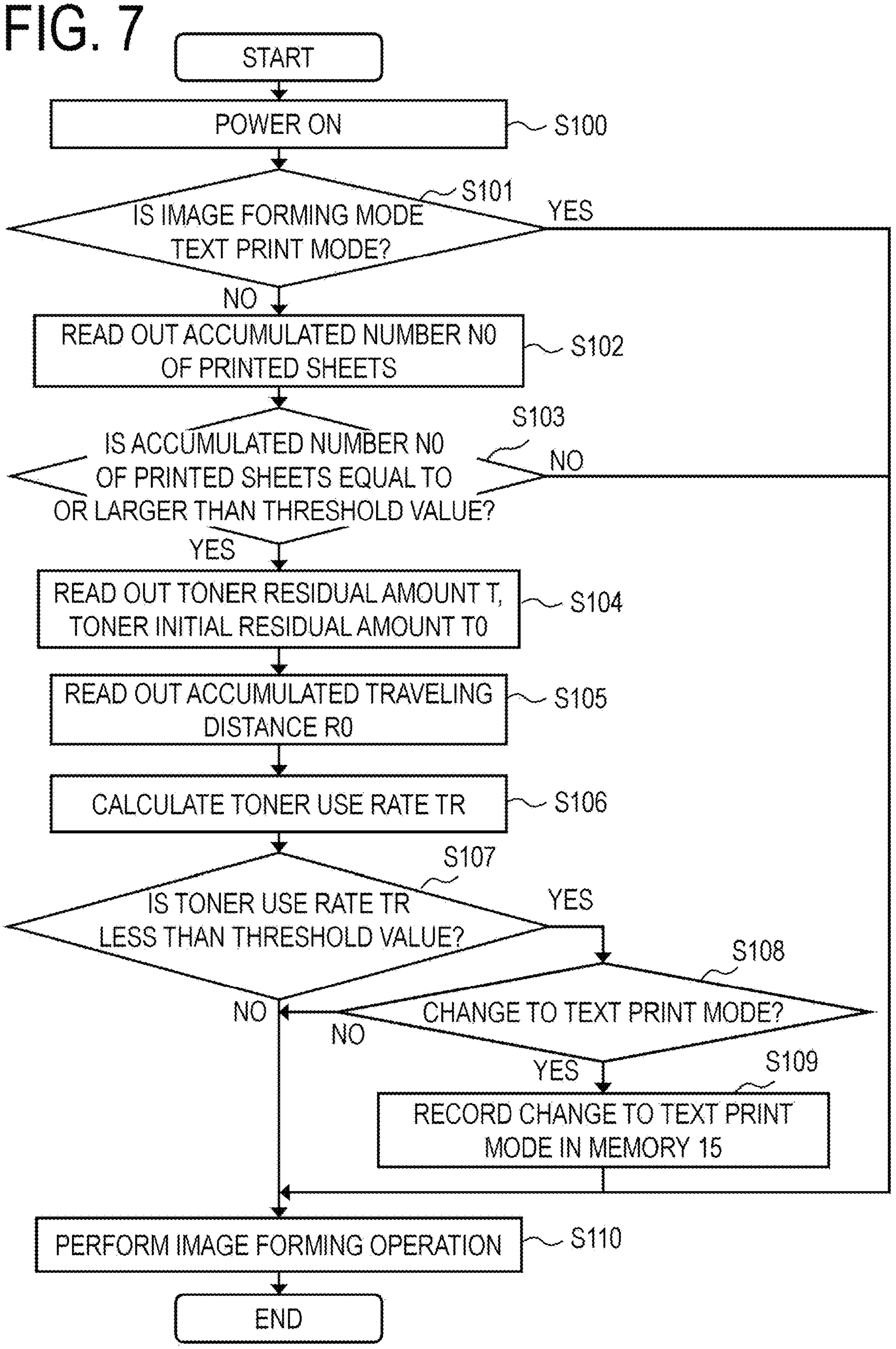
FIG. 7 is a flowchart for promoting a print mode change of Embodiment 1.

A method of prompting the print mode change (switching) in Embodiment 1 will be explained by using FIG. 7. FIG. 7 is a flowchart for prompting the print mode change in Embodiment 1.

First, when the power source of the image forming apparatus 100 is turned ON (S100), the control portion 200 determines whether or not the print mode is the text print mode. Here, if the print mode is the text print mode, the processing proceeds to S110, and the image forming operation is performed. On the other hand, if the print mode is not the text print mode but is the normal print mode, the processing proceeds to S102.

At S102, the control portion 200 communicates with the memory 15 (memory tag) of the process cartridge 9 and reads out the accumulated number N0 of printed sheets. This accumulated number N0 of printed sheets is information at the time when the image forming apparatus 100 was stopped the previous time and corresponds to the number of sheets printed from the state where the developing device 8 was new.

Subsequently, at S103, the control portion 200 determines whether or not the accumulated number N0 of printed sheets is equal to or larger than the threshold value. Here, if the accumulated number N0 of printed sheets is less than the threshold value and the number of printed sheets has not reached the predetermined number of sheets, the processing proceeds to S110, and the image forming operation is performed. On the other hand, if the accumulated number N0 of printed sheets is equal to or larger than the threshold value and has reached the number of printed sheets determined in advance, the processing proceeds to S104.

At S104, the control portion 200 communicates with the memory 15 of the process cartridge 9 and reads out the toner residual amount T and the toner initial residual-amount T0 when the developing device 8 was new. This toner residual amount T is information when the image forming apparatus 100 stopped the previous time and is a value calculated by the toner-amount calculating portion 300.

Subsequently, at S105, the control portion 200 communicates with the memory 15 of the process cartridge 9 and reads out the accumulated traveling distance R0 of the development roller 4. This accumulated traveling distance R0 is information at the time when the image forming apparatus 100 was stopped the previous time and is a value counted by the traveling-distance detecting device 400.

Subsequently, at S106, the control portion 200 calculates the toner use rate TR on the basis of the toner residual amount T, the toner initial residual-amount T0, and the accumulated traveling distance R0. The toner use rate TR is calculated by TR=(T0−T)/R0 as described above.

Subsequently, at S107, the control portion 200 determines whether or not the toner use rate TR is less than the threshold value determined in advance. Here, if the toner use rate TR is equal to or larger than the threshold value, the processing proceeds to S110, and the image forming operation is performed without any notification to the user. On the other hand, if the toner use rate TR is less than the threshold value, the processing proceeds to S108.

At S108, the user is asked to select whether or not to change the print mode to the text print mode. In Embodiment 1, the proposal of the mode change to the user is performed by display on the operation panel 60. If the user selects not to change the print mode to the text print mode, that is, when the user selects to continue the print mode as the normal print mode, the processing proceeds to S110, and the image forming operation is performed in the normal print mode.

On the other hand, at S108, if the user selects to change the print mode to the text print mode, the processing proceeds to S109, the print mode is changed to the text print mode, and the text print mode is recorded as the print mode in the memory 15. Then, the processing proceeds to S110, and the image forming operation is performed in the text print mode.

Note that the flowchart in FIG. 7 is only an example of a print-mode change proposing operation, and a method, an order and the like of each process can be changed as appropriate. For example, the reading out of the toner residual amount T and the toner initial residual-amount T0 (S104) may be executed after the reading out of the accumulated traveling distance R0 (S105). Moreover, for example, the reading out of the toner residual amount T and the toner initial residual-amount T0 (S104) and the reading out of the accumulated traveling distance R0 (S105) may be executed at the same time as the reading out of the accumulated number N0 of printed sheets (S102). Moreover, for example, a process from the reading out of the toner residual amount T and the toner initial residual-amount T0 (S104) to the determination on whether or not the toner use rate TR is less than the threshold value (S107) may be executed before the reading out of the accumulated number N0 of printed sheets (S102).

Moreover, in Embodiment 1, a proposal to change the print mode to a user or a selection instruction to change the print mode by a user is performed by the operation panel 60, but it may be performed by the other display portion or the operation portion of the image forming apparatus 100 or an external device.

Evaluation Experiment

Subsequently, in Embodiment 1, an evaluation experiment conducted in order to verify an effect when a change from the normal print mode to the text print mode was made will be explained. In this experiment, regarding Embodiment 1 and Comparative Example 1, in an environment of 25° C./50% RH, a print operation of 2 sheets per job for 10000 recording materials was continuously performed. For the print operation, a lateral line with an image print percentage of 1.0% was used as image data.

In the normal print mode in Embodiment 1, it is so configured that the cleaning operation on the surface of the charging roller 2 is performed every ten sheets of print (every 5 print jobs) in the print operation. It is configured such that, in the normal print mode, the development drive distance per printed sheet becomes 1.5 times of the text print mode by performing a cleaning sequence as above. As a result, the toner use rate TR in the normal mode in this evaluation experiment was 1.3 μg/mm and the toner use rate TR of the text print mode was 2.0 μg/mm. Moreover, as the developing device 8 in Embodiment 1, the one in which the toner of 100 g is accommodated in the toner accommodating chamber 8*a* when the device was new was used. Comparative Example 1 is configured similarly to Embodiment 1 except that the print mode is not changed.

In the evaluation experiment, for Embodiment 1 and Comparative Example 1, the number of printed sheets in which a fogging image occurred and the toner residual amount T at a timing when the fogging image occurred were evaluated. In Embodiment 1, the print mode was changed to the text print mode at the time when the accumulated number N0 of printed sheets reached 5000. In Comparative Example 1, the change of the print mode is not performed, and the image forming operation is continued in the normal print mode. Table 1 illustrates evaluation results of Embodiment 1 and Comparative Example 1.

TABLE 1

| | Embodiment 1 | Comparative Example 1 |
|---|---|---|
| Accumulated number N0 of printed sheets at occurrence of fogging image | 8000 sheets | 7000 sheets |
| Toner residual amount T at occurrence of fogging image | 60.0 g | 65.0 g |

As shown in Table 1, in Embodiment 1, a fogging image occurred at the time when the accumulated number N0 of printed sheets is 8000, and the toner residual amount at this time was 60.0 g. On the other hand, in Comparative Example 1, a fogging image occurred at the time when the accumulated number N0 of printed sheets is 7000, and the toner residual amount at this time was 65.0 g.

From the aforementioned results, it is known that the timing of Embodiment 1 when the fogging image occurs is slower (the accumulated number N0 of printed sheets is larger) than that of Comparative Example 1 and the toner residual amount T becomes smaller. That is, in Embodiment 1 in which the print mode is changed to the text print mode, deterioration of the tonner is suppressed and thus, occurrence of a fogging image can be suppressed, and the toner amount that can be used before the deterioration increases as compared with Comparative Example 1.

As described above, the image forming apparatus 100 according to Embodiment 1 is constituted capable of executing the normal print mode and the text print mode, and prompts the user to make a change from the normal print mode to the text print mode on the basis of the toner use rate TR calculated on the basis of the use situation of the user. That is, according to the constitution of Embodiment 1, since the print mode is configured capable of changing to the text print mode from which the cleaning sequence was excluded, the occurrence of a fogging image can be suppressed.

Note that, Embodiment 1 was configured such that the cleaning operation on the charging roller surface is excluded in the text print mode, but it may be so configured that the cleaning operation is performed at a lower frequency as compared with the normal print mode. In the configuration as above, too, as compared with the image forming apparatus 100 in which only the normal print mode is performed, stains of the charging roller 2 is suppressed, the occurrence of a fogging image is suppressed, and the toner amount which can be used before deterioration increases.

Embodiment 2

Subsequently, Embodiment 2 according to the present invention will be explained. A basic configuration and operation of the image forming apparatus 100 of Embodiment 2 are similar to those of the image forming apparatus 100 in Embodiment 1. In the explanation below, configurations similar to those in Embodiment 1 are given the same signs, and explanation will be omitted, and featured parts of Embodiment 2 will be mainly explained. Embodiment 2 is different from Embodiment 1 in a point that the user is prompted to change the print mode on the basis of a toner deterioration degree W.

The print mode change based on the traveling distance of the development roller 4 and the toner use amount in Embodiment 2 will be explained. In Embodiment 2, the print mode is set to the normal print mode as initial setting. And the control portion 200 proposes a change of the print mode on the basis of the developer amount information related to the amount of the toner 3 accommodated in the toner accommodating chamber 8*a*, the development drive information related to the movement distance of the surface of the development roller 4, and the developer consumption-amount information related to the consumed toner amount. More specifically, the control portion 200 proposes the change of the print mode from the normal print mode to the text print mode on the basis of the toner deterioration degree W calculated from the developer amount information, the development drive information, and the developer consumption-amount information.

In Embodiment 2, the developer amount information is the toner residual amount T accommodated in the toner accommodating chamber 8*a* and is acquired by the toner amount sensor 20 as the first acquiring portion. Moreover, the development drive information is a section traveling distance Rc, which is a traveling distance of a predetermined section of the development roller 4 and is acquired by the traveling-distance detecting device 400 as the second acquiring portion. Moreover, the developer consumption-amount information is toner consumption amount Tc consumed in the predetermined section and can be calculated by the toner residual amount T or the like acquired by the toner amount sensor 20. Hereinafter, a method of proposing a change of the print mode on the basis of these pieces of information will be explained in more detail.

Toner Deterioration Degree

As described above, in Embodiment 2, a user is prompted to change the print mode on the basis of toner deterioration degree (developer deterioration degree) W. Thus, first, a detail of the toner deterioration degree W will be explained. The toner deterioration degree W is a value having an initial value of "0", counted up with rotational drive of the development roller 4, and gradually rising with progress of deterioration of the toner. Moreover, since the toner deterioration degree W in Embodiment 2 is an average deterioration degree of the entire toner in the developing device expressed in numeral values, if the toner amount in the developing device 8 is small, a progress speed of the deterioration degree becomes higher, and the toner deterioration degree W can become larger easily.

In Embodiment 2, by actually measuring or presuming these parameters, the toner deterioration degree W can be calculated on the basis of a calculating method, which will be explained below. In Embodiment 2, such a method was used that the toner deterioration degree W is calculated each time two sheets of paper as the recording material (recording medium) are output as a predetermined section.

A formula (1) used when the toner deterioration degree W is calculated in Embodiment 2 is as follows:

$$W_n = W_{n-2} + (1/T_{n-2}) * (Rc/Tc) \quad \text{Formula (1)}$$

Each parameter used in the formula (1) is as follows:

Toner deterioration degree at the end of drive of the n-th sheet of the print: $W_n$ Toner deterioration degree at the end of drive of the n−2-th sheet of the print: $W_{n-2}$ Section traveling distance of development roller having driven on the n−1-th and the n-th sheet of the print: Rc Toner residual amount at the end of drive of the n−2-th sheet of the print: $T_{n-2}$ Toner amount consumed during image forming operation of the n−1-th and n-th sheet of the prints: Tc According to the formula (1), if the development-roller drive distance per sheet of print is large, the section traveling distance Rc of the development roller 4 becomes large and thus, a rising degree of the toner deterioration degree W becomes large. Moreover, if the toner amount consumed per sheet of print is small, the toner consumption amount Tc consumed during the drive becomes small and thus, the rising degree of the toner deterioration degree becomes large.

Note that the predetermined section for calculating the toner deterioration degree W does not necessarily have to be calculated two sheets each, but may be every job, every predetermined number of sheets or every desired development-roller traveling distance. That is, a toner deterioration degree W2 immediately after the end of the predetermined section can be calculated on the basis of the toner deterioration degree W1 and the toner residual amount T1 immediately before start of the predetermined section, the traveling distance (movement distance) Rc for a predetermined section of the development roller 4, and the toner consumption amount Tc consumed in the predetermined section. By applying these parameters to the formula (1), the toner deterioration degree (developer deterioration degree) W2 immediately after the end of the predetermined section is expressed by a formula (2) below:

$$W2 = W1 + (1/T1) * (Rc/Tc) \quad \text{Formula (2)}$$

Calculating Method of Toner Deterioration Degree

Figure 8:
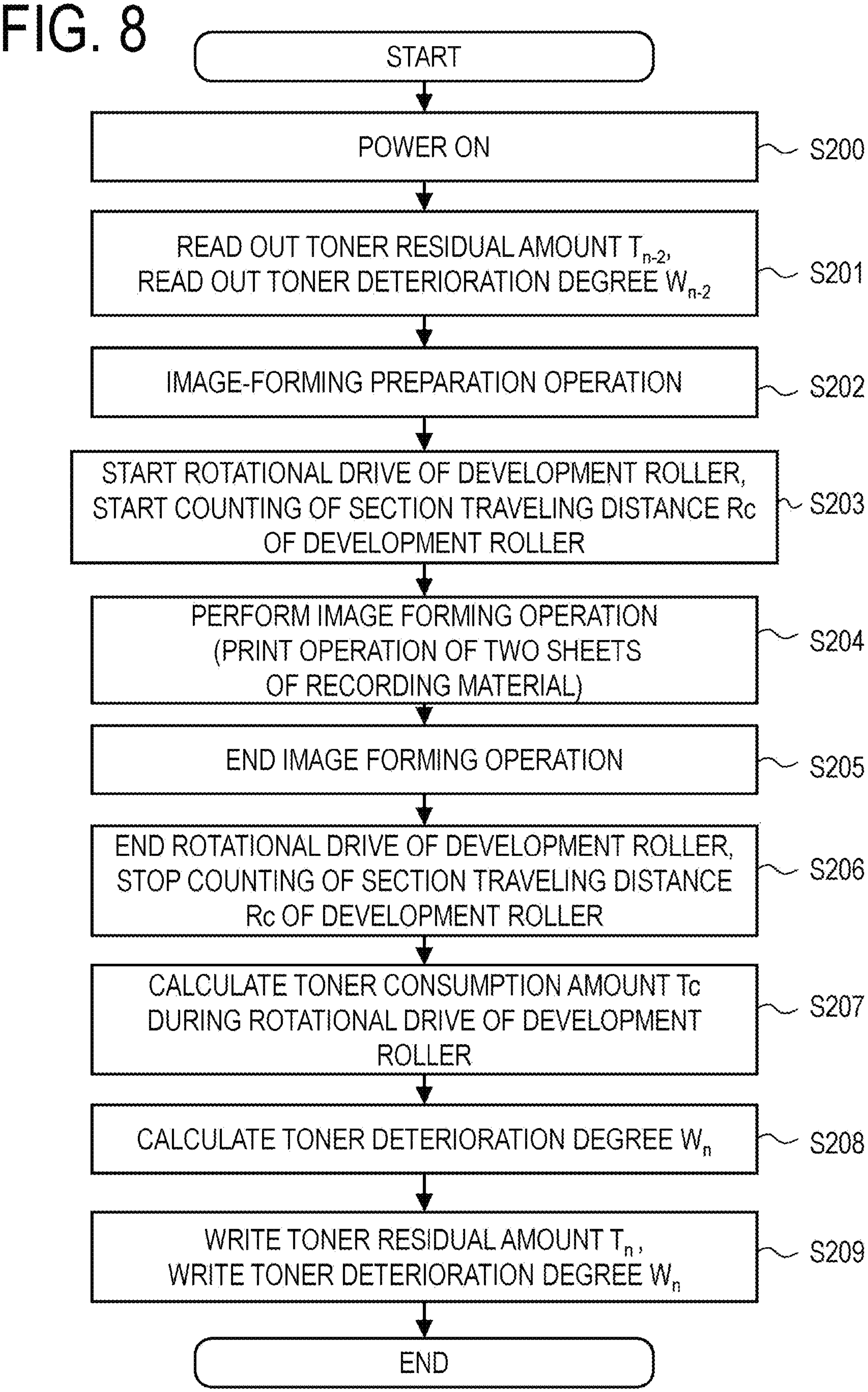
FIG. 8 is a flowchart for calculating a toner deterioration degree of Embodiment 2.

The calculating method of the toner deterioration degree W of Embodiment 2 will be explained by using FIG. 8. FIG. 8 is a flowchart of the calculating method for calculating the toner deterioration degree in Embodiment 2. The calculating method example explained here is a case of 1-job 2-sheet print for facilitation.

First, when the power of the image forming apparatus 100 is turned ON (S200), at S201, the control portion 200 communicates with the memory 15 of the process cartridge 9 and reads out the toner residual amount $T_{n-2}$ and the toner deterioration degree $W_{n-2}$. The toner residual amount $T_{n-2}$ and the toner deterioration degree $W_{n-2}$ are information at the time when the image forming apparatus 100 was stopped previous time and information at the time when the print operation of the number of printed sheets n−2 was completed.

Subsequently, at S202, an image-forming preparation operation is started. Then, at S203, the rotational drive of the development roller 4 is started, and counting of the section traveling distance Rc of the development roller 4 is started.

Subsequently, at S204, as the image forming operation, a print operation for two sheets of the recording material is performed. Here, the image forming operation of the n−1-th sheet and the n-th sheet of the prints is performed. The, at S205, the image forming operation is finished. Then, at S206, the rotational drive of the development roller 4 is finished, and the count of the section traveling distance Rc of the development roller 4 is stopped.

Subsequently, at S207, the control portion 200 calculates the toner consumption amount Tc during the rotational drive of the development roller 4. The toner consumption amount Tc is calculated by taking a difference between the toner residual amount $T_{n-2}$ stored in the memory 15 and the toner residual amount $T_n$ detected by the toner amount sensor 20 immediately before. Note that, in Embodiment 2, the calculation of the toner consumption amount Tc is performed after the image formation is finished but may be performed during the image forming operation (before S206).

Subsequently, at S208, the control portion 200 calculates the toner deterioration degree $W_n$ at the end point of time of the print of the n-th sheet on the basis of the toner deterioration degree $W_{n-2}$, the toner residual amount $T_{n-2}$, the section traveling distance Rc of the development roller 4, and the toner consumption amount Tc. Then, the control portion 200 communicates with the memory 15 of the process cartridge 9 and writes information related to the toner residual amount $T_n$ in the toner accommodating chamber 8*a* and the toner deterioration degree $W_n$ at the end point of time of the print of the n-th sheet.

Print Mode Changing Operation Based on Toner Deterioration Degree

Subsequently, the change of the print mode based on the toner deterioration degree W will be explained. In Embodiment 2, it is so configured that, if the toner deterioration degree W exceeds a threshold value with respect to a predetermined number of printed sheets, the change of the print mode from the normal print mode to the text print mode is prompted. In Embodiment 2, the plurality of predetermined accumulated number N0 of printed sheets and a plurality of the threshold values of the toner deterioration degree W corresponding to the predetermined numbers of sheets are set. Table 2 illustrates a relation between the accumulated numbers of printed sheets N0 and the threshold values of the toner deterioration degree W.

TABLE 2

| | Accumulated number N0 of printed sheets | | | |
|---|---|---|---|---|
| | 2000 sheets | 4000 sheets | 6000 sheets | 8000 sheets |
| Threshold of toner value deterioration degree W | 15 | 35 | 55 | 80 |

As shown in Table 2, in Embodiment 2, it is configured such that, if the toner deterioration degree W is 15 or more at the time when the accumulated number N0 of printed sheets reaches 2000 sheets, the change from the normal print mode to the text print mode is prompted. Similarly, the threshold value of the toner deterioration degree W when the accumulated number N0 of printed sheets is 4000 is 35, the threshold value of the toner deterioration degree W when the accumulated number N0 of printed sheets is 6000 is 55, and the threshold value of the toner deterioration degree W when the accumulated number N0 of printed sheets is 8000 is 80.

Figure 9:
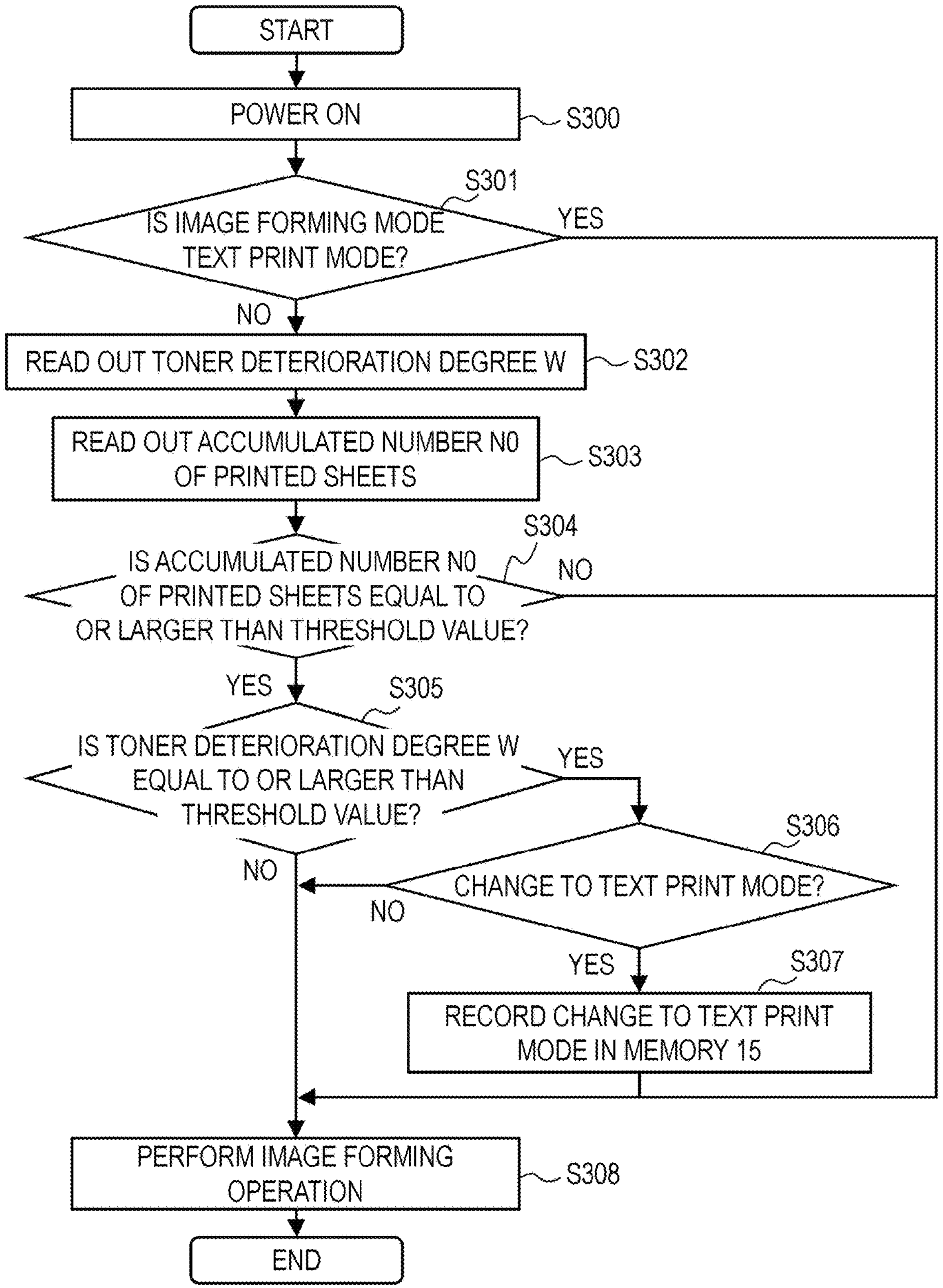
FIG. 9 is a flowchart for promoting a print mode change of Embodiment 2.

A method of prompting the print mode change in Embodiment 2 will be explained by using FIG. 9. FIG. 9 is a flowchart for prompting the print mode change in Embodiment 2.

First, when the image forming apparatus 100 is powered ON (S300), the control portion 200 determines whether or not the print mode is the text print mode. Here, if the print mode is the text print mode, the processing proceeds to S308, at which the image forming operation is performed. On the other hand, if the print mode is not the text print mode but the normal print mode, the processing proceeds to S302.

At S302, the control portion 200 communicates with the memory 15 of the process cartridge 9 and reads out the toner deterioration degree W. This toner deterioration degree W is information at the time when the image forming apparatus 100 was stopped the previous time and corresponds to the toner deterioration degree $W_n$ explained in the flowchart in FIG. 8.

Subsequently, at S303, the control portion 200 communicates with the memory 15 of the process cartridge 9 and reads out the accumulated number N0 of printed sheets. This accumulated number N0 of printed sheets is information at the time when the image forming apparatus 100 is stopped previous time and corresponds to the number of sheets printed since the developing device 8 was in a new state.

Subsequently, at S304, the control portion 200 determines whether or not the accumulated number N0 of printed sheets is equal to or larger than the threshold value. In Embodiment 2, the threshold values of the accumulated numbers N0 of printed sheets are 2000 sheets, 4000 sheets, 6000 sheets, and 8000 sheets illustrated in the aforementioned Table 2. If the accumulated number N0 of printed sheets has not reached the threshold value, the processing proceeds to S308, and the image forming operation is performed without notifying anything to the user. On the other hand, if the accumulated number N0 of printed sheets is equal to or larger than the threshold value, the processing proceeds to S305. This determination process is executed each time the accumulated number N0 of printed sheets reaches each threshold value.

Subsequently, at S305, the control portion 200 determines whether or not the toner deterioration degree W is equal to or larger than the threshold value. In Embodiment 2, the threshold value of the toner deterioration degree W is illustrated in the aforementioned Table 2 and is varied depending on the accumulated number N0 of printed sheets. If the toner deterioration degree W is less than the threshold value, the processing proceeds to S308, and the image forming operation is performed without notifying anything to the user. On the other hand, if the toner deterioration degree W is equal to or larger than the threshold value, the processing proceeds to S306.

At S306, the user is asked to select whether or not the print mode is to be changed to the text print mode. In Embodiment 2, the proposal of the mode change to the user is made by display on the operation panel 60. If the user selects that the print mode is not to be changed to the text print mode, that is, if the user selects to continue the print mode of the normal print mode, the processing proceeds to S308, and the image forming operation is performed in the normal print mode.

On the other hand, if the user selects to change the print mode to the text print mode in S306, the processing proceeds to S307, the print mode is changed to the text print mode, and the text print mode is recorded as the print mode in the memory 15. And the processing proceeds to S308, and the image forming operation is performed in the text print mode.

Note that the flowchart in FIG. 9 is only an example of the print-mode change proposing operation, and a method, an order and the like of each process can be changed as appropriate. For example, the reading out of the toner deterioration degree W (S302) may be executed after the determination on whether or not the accumulated number N0 of printed sheets is equal to or larger than the threshold value (S304). Moreover, for example, the determination on whether or not the toner deterioration degree W is equal to or larger than the threshold value (S305) may be executed before the reading out of the accumulated number N0 of printed sheets (S303).

Evaluation Experiment

Subsequently, an evaluation experiment conducted in order to verify an effect when the change from the normal print mode to the text print mode was made in Embodiment 2 will be explained. In this experiment, regarding Embodiment 2 (2-1, 2-2, 2-3, 2-4) and Comparative Example 2, in an environment of 25° C./50% RH, a print operation of 2 sheets per job for 10000 recording materials was continuously performed. For the print operation, a lateral line with an image print percentage of 1.0% was used as image data.

In the normal print mode in Embodiment 2, it was so configured that the cleaning operation on the surface of the charging roller 2 is performed every ten sheets of print (every 5 print jobs) in the print operation. It was configured such that, in the normal print mode, the development drive distance per printed sheet becomes 1.5 times of the text print mode by performing the cleaning sequence as above. Moreover, as the developing device 8 in Embodiment 2, the one in which the toner of 100 g is accommodated in the toner accommodating chamber 8*a* when the device is new was used. Comparative Example 2 is configured similarly to Embodiment 2 except that the print mode is not changed.

In the evaluation experiment, for Embodiment 2 and Comparative Example 2, the number of printed sheets in which a fogging image occurred and the toner residual amount T and the toner deterioration degree W at a timing when the fogging image occurred were evaluated. In this experiment, for Embodiment 2, Embodiments 2-1, 2-2, 2-3, 2-4 in which the timing when the print mode was changed from the normal print mode to the text print mode was changed were evaluated. In Embodiment 2-1, the print mode is set to the text print mode since the developing device 8 was new (beginning). The print mode is changed to the text print mode when the accumulated number N0 of printed sheets reaches 2000 sheets in Embodiment 2-2, when the accumulated number N0 of printed sheets reaches 4000 sheets in Embodiment 2-3, and when the accumulated number N0 of printed sheets reaches 6000 sheets in Embodiment 2-4, respectively. In Comparative Example 2, the change of the print mode is not made, and the image forming operation is continued in the normal print mode. Table 3 illustrates evaluation results of Embodiments 2-1, 2-2, 2-3, 2-4 and Comparative Example 2.

TABLE 3

| | Embodiment 2-1 | Embodiment 2-2 | Embodiment 2-3 | Embodiment 2-4 | Comparative Example 2 |
|---|---|---|---|---|---|
| Accumulated number N0 of printed sheets at occurrence of fogging image | a fogging image did not occur | 9500 sheets | 9000 sheets | 8000 sheets | 7000 sheets |
| Toner residual amount T | 50.0 g | 52.5 g | 55.0 g | 60.0 g | 65.0 g |
| Toner Deterioration Degree W | 110 | 115 | 116 | 115 | 115 |

As shown in Table 3, in Embodiment 2-1 in which the print mode is the text print mode all the time, even if the accumulated number N0 of printed sheets reached 10000 sheets, a fogging image did not occur. And the toner residual amount T at the time when the accumulated number N0 of printed sheets of Embodiment 2-1 was 10000 sheets was 50.0 g, and the toner deterioration degree W was 110.

In Embodiment 2-2 in which the print mode is switched to the text print mode at the time when the accumulated number N0 of printed sheets was 2000 sheets, a fogging image occurred at the time when the accumulated number N0 of printed sheets reached 9500 sheets. And the toner residual amount T at this time was 52.5 g, and the toner deterioration degree W was 115.

In Embodiment 2-3 in which the print mode is switched to the text print mode at the time when the accumulated number N0 of printed sheets was 4000 sheets, a fogging image occurred at the time when the accumulated number N0 of printed sheets was 9000 sheets. And the toner residual amount T at this time was 55.0 g, and the toner deterioration degree W was 116.

In Embodiment 2-4 in which the print mode is switched to the text print mode at the time when the accumulated number N0 of printed sheets was 6000 sheets, a fogging image occurred at the time when the accumulated number N0 of printed sheets was 8000 sheets. And the toner residual amount T at this time was 60.0 g, and the toner deterioration degree W was 115.

In Comparative Embodiment 2 in which the print mode is the normal print mode all the time, when the accumulated number N0 of printed sheets was 7000 sheets, a fogging image occurred. And the toner residual amount T at this time was 65.0 g, and the toner deterioration degree W was 115.

As described above, in these experiments, it is known that a fogging image on a white background part occurred at the accumulated number N0 of printed sheets at which the toner deterioration degree reached 115. Moreover, in each example of the Embodiment 2, the timing when a fogging image occurs is later (the accumulated number N0 of printed sheets is larger), and the toner residual amount T becomes smaller in comparison with Comparative Example 2. Moreover, the print mode change from the normal print mode to the text print mode is made at an earlier stage, the occurrence timing of the fogging image becomes much later, and the toner residual amount T becomes much smaller. That is, in Embodiment 2 in which the print mode can be changed to the text print mode, progress of the toner deterioration degree is suppressed, and the usable toner amount increases as compared with Comparative Example 2. As described above, the image forming apparatus 100 according to Embodiment 2 is configured capable of executing the normal print mode and the text print mode, and the user is prompted to change from the normal print mode to the text print mode on the basis of the toner deterioration degree W calculated on the basis of the use situation of the user. That is, according to the configuration of Embodiment 2, since it is configured such that the print mode can be changed to the text print mode from which the cleaning sequence was excluded, occurrence of a fogging image can be suppressed.

Note that, Embodiments 1, 2 are configured such that the normal print mode can be changed to the text print mode, but it is preferable to configure that the text print mode cannot be changed (returned) to the normal print mode. That is because, by means of use in the text print mode, toner stains of the charging roller 2 progresses more than a state of use in the normal print mode, and it is difficult to improve the toner stains to the same degree as the case where image density non-uniformity of a halftone image is continuously used in the normal print mode. However, if a period of time during which the image forming operation is performed in the text print mode is short, the toner stains of the charging roller 2 does not progress to such a state that the toner stains are too heavy to be used and thus, it may be so configured that the text print mode can be changed to the normal print mode.

Note that Embodiments 1, 2 are configured such that the cleaning operation on the charging roller surface is not performed in the text print mode, but it may be so configured that the cleaning operation is performed at a frequency lower than that of the normal print mode. In the configuration as above, too, as compared with the image forming apparatus 100 in which only the normal print mode is executed, the stains of the charging roller 2 is suppressed, and occurrence of a fogging image can be suppressed.

Moreover, Embodiment 2 is configured to prompt the print mode change when the toner deterioration degree set in advance for each of the numbers of printed sheets is equal to or larger than the threshold value, but it may be so configured that the change of the print mode is prompted (proposed) in an initial setup operation. Here, the initial setup operation includes a user-setup operation when a new image forming apparatus 100 is started for the first time and a setup operation before shipment for determining setting at product shipment. In the initial setup operation, a user or a service staff decides whether or not to change the print mode. Specifically, for example, it may be so configured that, at the start of the image forming apparatus 100, the change of the print mode is proposed when the toner residual amount T is the toner initial residual-amount T0, and the accumulated traveling distance R0 of the development roller 4 is zero. The configuration as above is particularly effective when it is known in advance that such use that lowers a toner use rate TR would be made.

Moreover, Embodiments 1, 2 are configured capable of proposing the change of the print mode, and whether or not the print mode is to be changed is left to a user's decision, but the control portion 200 may be configured capable of determining whether or not the print mode is to be changed. For example, in Embodiment 2, it may be so configured that, if the toner deterioration degree W is equal to or larger than the threshold value at the time when the predetermined accumulated number N0 of printed sheets is reached, the control portion 200 decides on the change of the print mode and changes the normal print mode to the text print mode. Alternatively, by associating a change proposal of the image forming mode with maintenance, it may be so configured that, when a service staff is to perform maintenance, the change of the image forming mode is proposed to the service staff.

Moreover, Embodiments 1, 2 are so configured that the first mode and the second mode whose frequencies at which the cleaning operation of the charging member is performed are different can be executed as the print modes and that the change of the print mode is prompted on the basis of the developer amount information and the development drive information, but they are not limiting. For example, instead of the cleaning operation, by paying attention to operations other than the image forming operation that is driven by the developing device 8 and can promote toner deterioration, the image forming mode may be divided into a first mode and a second mode with a frequency at which the development roller 4 is driven lower than that of the first mode. In the configuration as above, too, the change of the print mode is promoted or determined in accordance with the use situation of the image forming apparatus 100, whereby occurrence of defective images can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-137526, filed on Aug. 25, 2023, which is hereby incorporated by reference herein in its entirety.

What is claimed is:

1. An image forming apparatus comprising:

an image bearing member which is rotatable;

a charging member which is rotatable and charges the image bearing member;

a development member which is rotatable and supplies a developer to a surface of the image bearing member;

a developer accommodating portion which accommodates therein a developer supplied to the development member;

a first acquiring portion which acquires developer amount information related to an amount of a developer accommodated in the developer accommodating portion;

a second acquiring portion which acquires development drive information related to a movement distance on a surface of the development member; and a control portion which is capable of performing a first mode and a second mode, whose frequency of driving the development member is lower than the first mode, as an image forming mode, the control portion proposing or deciding on a change of the image forming mode from the first mode to the second mode on the basis of the developer amount information and the development drive information.

2. The image forming apparatus according to claim 1, wherein in the first mode, a cleaning operation, in which a developer adhering to a surface of the charging member is moved to the image bearing member to clean the charging member, is performed periodically, while in the second mode, the cleaning operation is performed at a frequency lower than that of the first mode or the cleaning operation is not performed.

3. The image forming apparatus according to claim 2, wherein the developer amount information is a residual amount of the developer accommodated in the developer accommodating portion, the development drive information is an accumulated movement distance, which is an accumulated movement distance of a surface of the development member, and assuming that the residual amount of the developer is T, the accumulated movement distance is R0, and an initial residual amount of the developer accommodated in advance in the developer accommodating portion is T0, the control portion proposes a change from the first mode to the second mode on the basis of a developer use rate TR calculated by $TR=(T0-T)/R0$.

4. The image forming apparatus according to claim 3, wherein in a case where the developer use rate TR is less than a predetermined threshold value, the control portion proposes a change from the first mode to the second mode.

5. The image forming apparatus according to claim 4, wherein in a case where an accumulated number of printed sheets of a recording material reaches a predetermined number of sheets, the control portion determines whether or not the developer use rate TR is less than the threshold value.

6. The image forming apparatus according to claim 2, wherein on the basis of a developer deterioration degree inside a developing device constituted by the developer accommodating portion and a development-member accommodating chamber accommodating the development member, with the developer deterioration degree being a developer deterioration degree acquired on the basis of the developer amount information and the development drive information, a change from the first mode to the second mode is proposed.

7. The image forming apparatus according to claim 6, wherein the developer amount information is a residual amount of the developer accommodated in the developer accommodating portion, and the developer drive information is a movement distance of a predetermined section of the surface of the development member, and assuming that a residual amount of the developer immediately before start of the predetermined section is T1, an accumulated movement distance of the predetermined section is Rc, a toner consumption amount consumed in the predetermined section is Tc, a developer deterioration degree immediately before start of the predetermined section is W1, and a developer deterioration degree immediately after the predetermined section is W2, the control portion proposes a change from the first mode to the second mode on the basis of a developer deterioration degree W2 calculated by $W2=W1+(1/T1)*(Rc/Tc)$.

8. The image forming apparatus according to claim 7, wherein in a case where the developer deterioration degree W2 is equal to or larger than a predetermined threshold value, the control portion proposes a change from the first mode to the second mode.

9. The image forming apparatus according to claim 8, wherein in a case where an accumulated number of printed sheets of a recording material has reached a predetermined number of sheets, the control portion determines whether or not the developer deterioration degree W2 is equal to or larger than the threshold value.

10. The image forming apparatus according to claim 9, wherein the predetermined number of sheets of the accumulated number of printed sheets and a threshold value of the developer deterioration degree W2 corresponding to the predetermined number of sheets are set in plural.

11. The image forming apparatus according to claim 1, wherein the image forming apparatus is configured such that a change from the second mode to the first mode is incapable after the first mode is changed to the second mode.

12. The image forming apparatus according to claim 2, further comprising:

a voltage applying portion which applies a charging voltage to the charging member, wherein in the cleaning operation, the voltage applying portion alternately applies to the charging member a charging voltage larger than a surface potential of the image bearing member and a charging voltage smaller than the same.

13. The image forming apparatus according to claim 1, wherein the control portion proposes a change from the first mode to the second mode to a user in an initial setup operation of the image forming apparatus.

14. The image forming apparatus according to claim 1, further comprising:

a memory which records that the currently set image forming mode is either one of the first mode and the second mode.

15. The image forming apparatus according to claim 2, wherein the first acquiring portion is an optical sensor having a light emitting portion which emits light and a light receiving portion which receives light emitted from the light emitting portion and having passed through inside the developer accommodating portion, and the optical sensor is provided at a center part of the developer accommodating portion in a rotation axis direction of the development member.

16. The image forming apparatus according to claim 2, wherein a developer having moved from the charging member to the image bearing member in the cleaning operation is recovered by the development member.

* * * * *